United States Patent [19]
Kregness et al.

[11] 4,366,548
[45] Dec. 28, 1982

[54] ADDER FOR EXPONENT ARITHMETIC

[75] Inventors: Glen R. Kregness, Minnetonka; Peter B. Criswell, Bethel, both of Minn.

[73] Assignee: Sperry Corporation, New York, N.Y.

[21] Appl. No.: 221,981

[22] Filed: Jan. 2, 1981

[51] Int. Cl.³ ............................................. G06F 7/48
[52] U.S. Cl. .................................... 364/748; 364/737
[58] Field of Search ........................ 364/737, 745, 748

[56] References Cited

U.S. PATENT DOCUMENTS

| | | | |
|---|---|---|---|
| 3,814,925 | 6/1974 | Spannagel | 364/787 |
| 3,829,673 | 8/1974 | Bouton, Jr. et al. | 364/748 |
| 3,871,578 | 3/1975 | Van De Goor et al. | 364/748 |
| 4,161,784 | 7/1979 | Cushing et al. | 364/748 |
| 4,282,581 | 8/1981 | Bondurrnt et al. | 364/737 |
| 4,305,134 | 12/1981 | Joyce et al. | 364/748 |
| 4,319,335 | 3/1982 | Rubinfield | 364/787 |

OTHER PUBLICATIONS

Litwak et al.: "Exponent Update and Latch in Three Levels", pp. 598-599, IBM Tech. Journal, vol. 9, No. 6, Nov. 1966, Armonk, New York.
J. E. Thornton: "Design of a Computer–The Control Data 6600", pp. 77-84, Scott Foresman & Co.-Glenview, Ill.
Davis, "The Illiac IV Processing Element", pp. 800-816, IEEE Transactions on Computers: vol. C-18, No. 9, Sep. 1969, see pp. 809-811, New York, New York.
Anderson et al.; "The IBM System 360 Model 91: Floating Point Execution Unit", IBM Tech. Journal, vol. 11, No. 1, Jan. 1967, pp. 34-53–See pp. 38-40 and FIG. 3; Armonk, New York.

*Primary Examiner*—Jerry Smith
*Attorney, Agent, or Firm*—Charles A. Johnson; Kenneth T. Grace; Marshall M. Truex

[57] ABSTRACT

A characteristic adder for use in a data processing system that performs floating-point arithmetic operations is described. A 1's complement subtractive adder is shown for forming the sum or difference of a pair of exponents under control of function control circuitry, along with an indication of which characteristic is larger for selecting which mantissa operand should be shifted for proper alignment. The function control circuitry responds to function signals to select addition or subtraction, provide the magnitude or complement of the results, and select between two available floating-point formats. Characteristic Overflow and Underflow is tested and signaled for each of the two possible floating-point formats.

18 Claims, 25 Drawing Figures

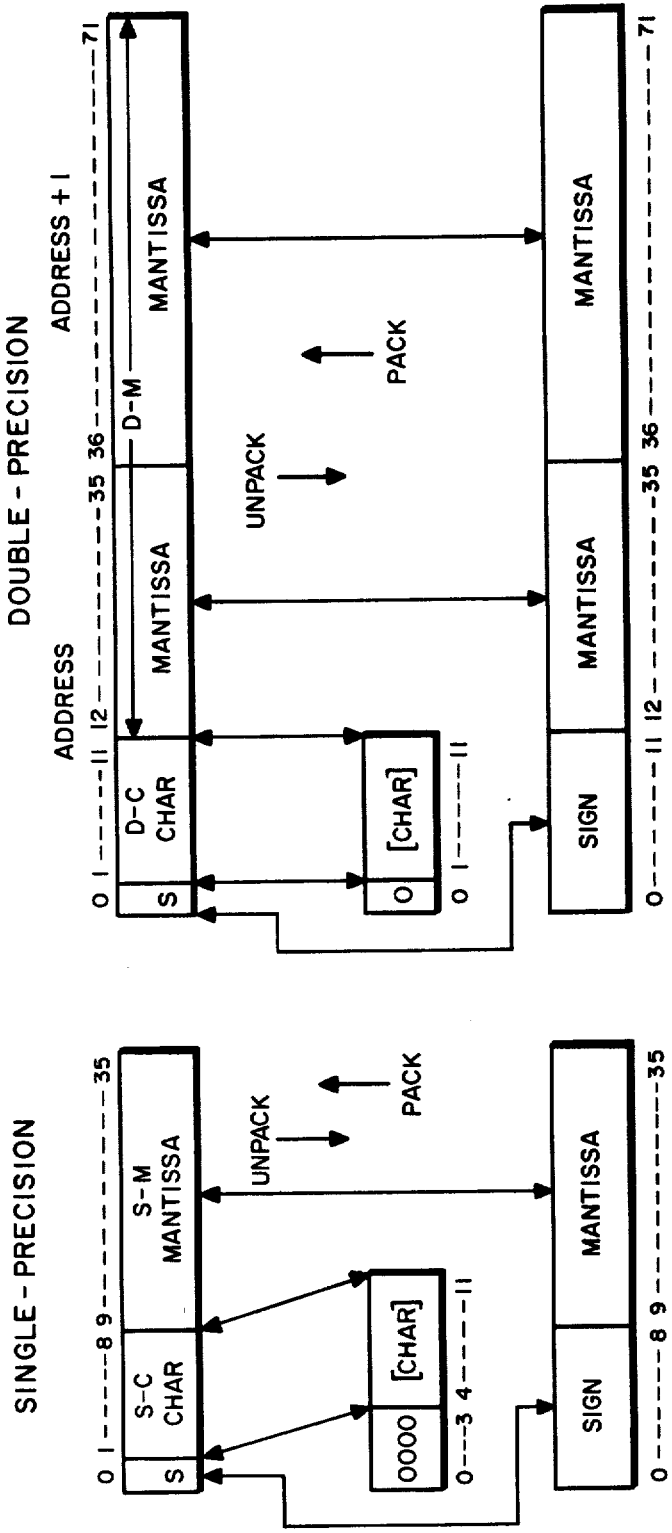

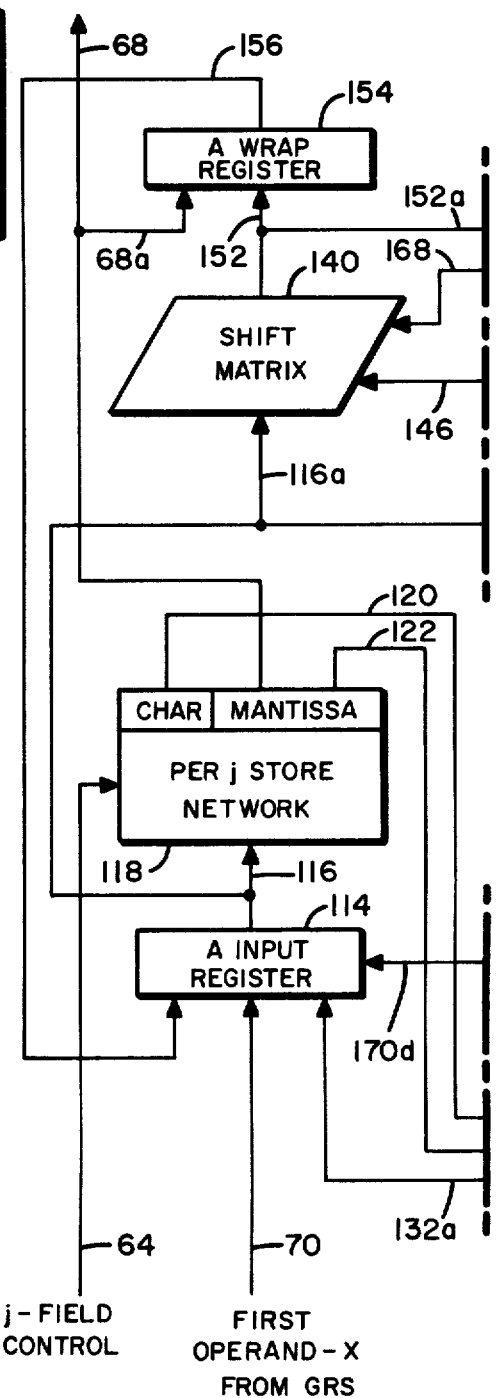

| f4 | FUNCTION |
|---|---|
| 0 | 11 BIT MODE |
| 1 | 8 BIT MODE : LEFT 3 OUTPUT |

| f5 | FUNCTION |
|---|---|
| 0 | DISABLE DETECTION |
| 1 | ENABLE OVERFLOW/UNDERFLOW |

ADDER FOR EXPONENT ARITHMETIC

BACKGROUND OF THE INVENTION

This invention relates to data processing systems which include computing devices, and more particularly to an improved arithmetic system for performing floating-point computations.

In computing devices employing floating-point arithmetic capability, the data or operands upon which arithmetic functions are to be performed are in a format such that one portion of the data word contains the actual information and is called the mantissa. A second portion of the data words contains the signals indicative of the relative position of the arithmetic point, such as decimal or binary point, of the information contained in the mantissa, and is referred to as the characteristic. To perform arithmetic operations on data on the floating-point format, the actual arithmetic operations are performed on the signals of the mantissa portion of the data words, and the characteristics are used primarily to indicate the relative positions of the floating-point operands under consideration, and are utilized in determining the characteristic of the result of the arithmetic operation. For example, in adding two floating-point operands, each having its own characteristic and mantissa, arithmetic section of the data processing system utilizes the two characteristics to determine the actual digit-by-digit alignment of the mantissa portions in preparation for performing the floating-point arithmetic operation. For an add operation, the aligned mantissas are added together to form a new floating-point mantissa, and a resultant floating-point word is generated as a result of the combination of the newly formed mantissa with the characteristics. Floating-point substraction, multiplication, division, or format conversion, all involve manipulation of the characteristic.

The floating-point data words are stored, transferred, and processed, via a plurality of multiple-bit registers. Each bit position of a register represents a power of the radix of the register, and the modulus of the register is the radix raised to the power indicated by the number of bit positions of the register. For example, a 1's complement six-bit register has a modulus $2^6$, with the least significant bit position having a value $2^0$, with each increasing bit position having a value of 2 raised to the power designated by the bit position. For use with operands in floating-point format, the registers must utilize sufficient bit positions for holding the representation of the mantissa the characteristic. For single-precision format, the entire operand comprised of the sign, characteristic, and mantissa, is contained in a single register, however, the portion devoted to the mantissa is independent of the portion devoted to the characteristic. These entities are handled substantially independently.

The bit capacity of registers in the data processing system often relate to the number of bit positions in the memory registers. Operands in the floating-point format that are contained within the number of bit positions of a memory register capacity are often referred to as single-precision floating-point operands. The limitation of the number of bit positions to a single register obviously places limitations on the capacity and precision of the arithmetic manipulations. In order to increase the capacity of the floating-point operands, systems have been developed that utilize two full operands to comprise a single floating-point operand. This effectively doubles the bit capacity, and is commonly referred to as double-precision floating-point operation. In the double-precision format, the characteristic often times utilizes more bit positions than would be utilized for the single-precision format. In computing systems that utilize both single-precision and double-precision formats, systems have been devised for converting floating-point operands between the two systems of representation. For those systems that utilize a different number of bit positions to represent the characteristics between single-precision and double precision, it is necessary that the conversion between formats provide for adjustment of the characteristic representation. Further, it is necessary that there be adjustments of the mantissa when the conversion is from double-precision to single-precision format, it is common to require that the number of the characteristic bits be reduced, and that certain bit positions in the mantissa be dropped. During the converse conversion, the number of bit positions of the characteristic is increased, and the additional number of bit positions of the mantissa is made available.

Both the characteristic and mantissa for floating-point arithmetic operations, whether they be single- or double-precision, may represent positive or negative values. The sign bit referenced represents the sign of the mantissa. To avoid using two separate sign designations, that is, one for the characteristic and one for the mantissa, within the same operand, a system of characteristic biasing has been developed to indicate the sign of the characteristic. For example, a single-precision floating-point operand that provides for an eight-bit characteristic, can express numerical values ranging from 0 through octal 377. By arbitrarily applying a bias of octal 200 to the actual characteristic, the zero point is effectively shifted and permits the numerical representation of minus octal 200 through octal 177. In this manner, the value of the characteristic indicates whether it is positive or negative, with those characteristic values having a numerical value of octal 200 or less, representing negative characteristic values. A similar biasing system is applied to double-precision characteristics, with the same purpose. For example, if an eleven-bit characteristic is utilized, a bias of octal 2000 establishes a mid-point with numerical values of octal 2000 or less being of a negative value and characteristic values of more than octal 2000 being of a positive value. It can be seen, of course, that when converting between a single- and double-precision formats, the biasing as well as the bit capacity must be adjusted.

In performing conversion from double-precision floating-point to single-precision floating-point, care must be taken to establish that the magnitude of the double-precision characteristic can be expressed in a number of bit positions available in the single-precision format. In the event that a double-precision floating-point characteristic has a numerical value greater than the upper positive range of the single-precision floating-point characteristic, an overflow fault will occur, and an indication of this failure should be provided. Similarly, a double-precision floating-point characteristic on the lower extremity of the range that extends beyond the bit capacity of the single-precision floating-point operand cannot be accurately converted, and will cause an underflow fault to occur. The characteristic biasing system, the conversion from double-precision floating-point to single-precision floating-point and for conversion from single-precision floating-point to double-precision floating-point is described in detail in U.S. Pat. No. 3,389,379 to G. J. Erickson, et al.

When adding or subtracting two floating-point operands, it is necessary that each of the mantissa portions be aligned so that bit-positions having similar weights will be properly added. The alignment is determined by the examination of each of the characteristic portions. Normally, it would be desirable to subtract the smaller characteristic from the larger characteristic to determine the amount of shift for proper alignment of the smaller floating-point operand. In practice, however, it is generally not known which of the two available floating-point operands is the larger. For two characteristic values X and Y, the shift count for alignment purposes has been generated by the use of two adders producing the differences X-Y and Y-X, and thereafter selecting the positive result. This requires the use of two adders and requires some additional selection time. Since the alignment process must be accomplished before the actual computation can progress, any time that can be saved will enhance the overall operation of the data processing system. Of course, any hardware that can be saved will decrease the cost of the system. Other approaches have been developed, utilizing relatively complex circuitry mixing computations between 1's complement computation with 2's complement computation.

Prior art floating-point data processing systems have not provided adder assistance for use in characteristic calculations that provide for the generation of the functions X-Y or Y-X dependent upon the relative values of X and Y such that the absolute value of the difference between X and Y is provided along with a signal specifying which of the two characteristics is the smaller numerical value. Further, prior art systems have not provided for detection of overflow and underflow faults in the characteristic adder. Prior art systems have not provided characteristic adders that can handle two characteristic formats for use in single-precision and double-precision calculations while providing the absolute value of the difference between X and Y and the signal defining which of the two characteristics is the smaller of the two.

SUMMARY OF THE INVENTION

With the foregoing Background of the Invention in mind, and in accordance with the present invention, an improvement in data processing systems that perform floating-point arithmetic operations utilizing an improved characteristic adder is described. The characteristic adder includes a 1's complement subtractive arithmetic system that provides the sum or difference of a pair of characteristic operands for use in alignment of mantissa operands, together with an indication of which operand is the larger. A sum is formed by subtracting the 1's complement of one operand from the other operand thereby effectively adding the two. Subtraction is performed directly by subtracting one operand from the other in 1's complement notation. The subtractive adder employs a borrow and propagate calculation system, and is partitioned so that sets of bit positions are arranged for ripple borrow within the set. Look ahead circuitry anticipates the group borrow and group propagate between the bit groupings.

Function control circuitry allows selection of the absolute magnitude of the result, the true value or complement value of the result, and provides alternatively for the manipulation of characteristics that are expressed in two different data formats. The results of the add or subtract manipulation is evaluated by Overflow and Underflow detection circuits to provide Overflow signals for each of two possible characteristic data formats, and Underflow signals when enabled by the function control circuitry. Complementing circuitry is utilized to provide the 1's complement of the result when activated by the function control circuitry. Shifting circuitry provides alignment of the result for accommodating a data format for characteristics having fewer bits than the bit capacity of the characteristic adder.

The characteristic adder utilizes a plurality of half-add circuits that generate borrow and propagate signals. The look ahead circuitry in the partitioned adder provides group borrow signals and group propagate signals in response to the borrow and propagate signals. A second plurality of half-add circuits is interconnected for ripple borrow propagation within each partitioned group, and is responsive to the look ahead circuitry and the first set of half-add circuits to provide the 1's complement sum in response to the borrow and propagate signals and the group borrow and group propagate signals.

The floating-point system utilizes the resultant output of the characteristic adder to provide alignment shift counts for various floating-point operations. Since the floating-point system has a predetermined bit capacity, shift counts that exceed the system capacity will be of little or no value. Accordingly, the system provides for selected evaluation of the result to determine if it exceeds a predetermined value, and provides control signals indicating that condition when the magnitude of the result exceeds the predetermined threshold value.

The characteristic adder will be utilized for different purposes and functions at different points within a floating-point operation and for different floating-point instructions. The function control circuitry in response to the function signals applied, provide the control and selection in combination with control signals that are fed back from the adder to cause it to form the various arithmetic operations and error condition evaluations and format adjustments described. For example, when the add operation is selected, one set of function signals will provide controls that will cause the complementation of one of the operands before being applied to the subtractive adder. Alternatively, for a subtract operation the function signals would indicate that the second operand is to be applied directly without complementation. Control selection also allows for either of the two operands to be passed through the characteristic adder without being altered by simply overriding the affect of the unselected operand. When the characteristic adder is being utilized for calculating a shift count, the magnitude of the result is required and function control signals will make that selection. At the same time, the Overflow and Underflow evaluations are meanless during the calculation of shift count signal, so these error conditions are inhibited by appropriately selected function signals. When it is determined that the sign of the mantissa is negative, the calculated resultant characteristic is complemented prior to recombination with the resultant mantissa. This complementing is signaled by an appropriate function signal control. Complementing can also be required as a result of the evaluation of the adder sign or magnitude control. When a shift count is being calculated, the function control signals provide for enabling detection of the magnitude of the resultant shift count to determine whether is exceeds a predetermined threshold value or not. The function control signals provide the format selection for appropriately aligning the resultant characteristic depending upon which of two possible formats is selected.

OBJECTS

In view of the foregoing Background of the Invention and Summary of the Invention, it is a primary object of this invention to provide an improved floating-point data processing system.

It is a further object of this invention to provide an improved characteristic adder for use in floating-point arithmetic operations.

Still another object of this invention is to provide an improved system for performing floating-point calculations including a characteristic adder for providing the absolute value of the difference between a pair of floating-point characteristics, together with a selection signal determining which of the two characteristic values is the lesser of the two.

Still another object of this invention is to provide a system for performing floating-point calculations capable of handling two distinct characteristic formats and including an improved characteristic adder system.

Still a further object of this invention is to provide an improved system for performing floating-point calculations including an improved characteristic adder circuit functioning in 1's complement arithmetic operation that are capable of generating the absolute value of the difference between a pair of characteristics, together with a signal indicating which of the two characteristics is the smaller of the two, and further providing for the complement of the difference between the pair of characteristics, the true value of the difference of the two characteristics, or the absolute difference of the two characteristics.

Still a further object of this invention is to provide an improved system for performing floating-point calculations, including an improved characteristic adder circuit that detects and signals both the overflow and underflow error conditions of the characteristic.

Still another object of this invention is to provide an improved floating-point calculation system that provides for the compression of the shift count for alignment of the mantissa to assure proper shift matrix operation when it is determined that the calculated shift count would result in the entire mantissa being shifted out of the calculation range of the system.

These and other more detailed and specific objectives of the invention will become clearer to those skilled in the art from a consideration of the following Description of the Preferred Embodiment when taken in conjunction with the accompanying drawings.

DESCRIPTION OF THE DRAWINGS

FIG. 4 illustrates the format of the single-precision operand;

FIG. 5 illustrates the format of the double-precision operands;

FIG. 6a through FIG. 6c, when arranged as shown in FIG. 6 is a block diagram of the Arithmetic Unit that incorporates the subject invention;

DESCRIPTION OF THE PREFERRED EMBODIMENTS

Figure 1:
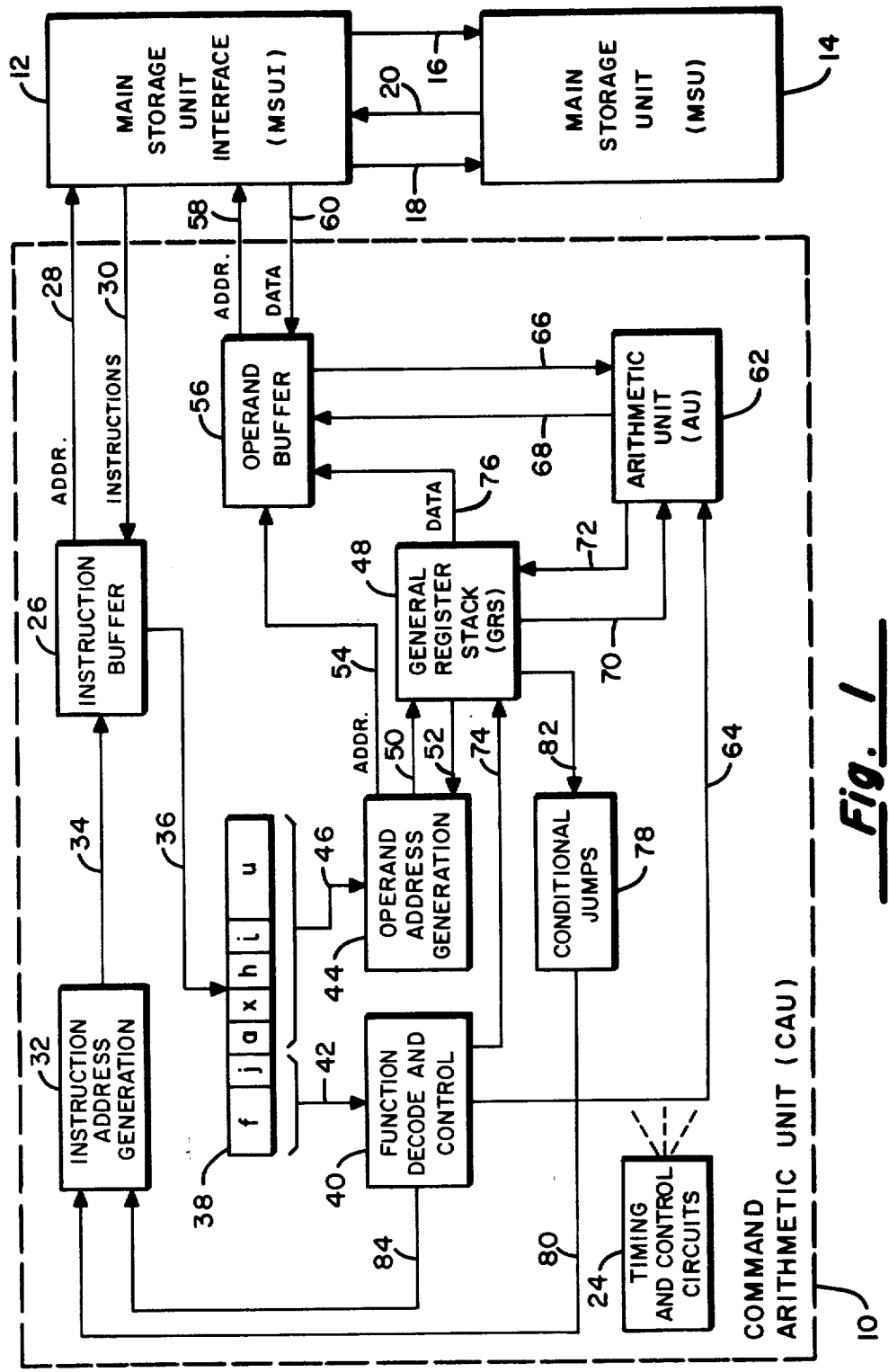
FIG. 1 is a simplified functional diagram of a data processing system which incorporates the subject invention and illustrates the functional relationship of the various data processing components and controls.

FIG. 1 is a simplified functional diagram of a data processing system which incorporates the subject invention and illustrates the functional relationship of the various data processing components and controls. The system utilizes a Command Arithmetic Unit, hereinafter referred to as CAU 10, and Main Storage Unit Interface, hereinafter referred to as MSUI 12, and a Main Storage Unit, hereinafter referred to MSU 14. The lines with arrowheads indicate direction of flow of data or flow of control. MSU 14 is a large-scale memory having addressable memory registers in which data words can be stored and from data words can be read. The MSU 14 stores instruction words which are utilized to direct and control the operation of the data processing system, and data words which are the subject of or result of operations of the data processing system, both of which are referred to as operands. MSU 14 can be selected from any of the types of addressable storage devices available commercially, it being understood that the requirement be that the specification of an address and a write control on line 16 will result in addressing the specified memory address and providing the recording of the operand received on line 18. The specification of a memory address and a read function on line 16 will result in the contents of the specified memory register being read and supplied on line 20. The Main Storage Unit Interface 12 operates as the clearing house for all data transfers to and from MSU 14. The system illustrated is shown in simplified form, it being understood that MSUI 12 can accommodate more than one CAU 10, as well as various other input/output devices not shown. The memory referencing is such that instructions and data words are both capable of being stored in MSU and referenced therefrom. The actual memory addressing and accessing systems do not aid in an understanding of the invention, and are described in general terms only to provide an environment in which the invention functions. Similarly, the MSUI detailed functioning and handling of requests and responses is not deemed necessary to an understanding of the invention.

The Command Arithmetic Unit 10 includes a Timing and Control 24 that operates to direct all functional sections, including interpreting instructions and directing the various computational tasks to be performed by the directed functional units. Instructions are stored in the Instruction Buffer 26 where a plurality of individual instructions are stored for sequential or directed execution. Instructions are obtained from the MSU via MSUI by sending an address on line 28 which results in a grouping of instructions to be read from the MSU and returned to the Instruction Buffer over line 30. The address of instructions to be generated are derived through the Instruction Address Generation circuitry 32 which includes a register for storing the next instruction address. The address of the instruction is directed on line 34 to the Instruction Buffer 26 where it is translated and the selected instruction is read on line 36 to the instruction register 38. The Instruction Address Generation circuitry 32 includes a means for automatically advancing the address of the instruction to the next sequential address which will be operative. The next instruction will be selected upon completion of the present instruction provided there are no jump conditions that occur during the execution of the present instruction. Function Decode and Control 40 utilizes a portion of the signals stored in the instruction Register 38, as received on line 42, and operates to generate the signals necessary to properly execute the instruction. The Operand Address Generation circuitry 44 is coupled to a portion of the Instruction Register 38 by line 46, and operates to form an absolute address of the operand from the address designation, and address indexing designations specified in the instruction. The General Register Stack (GRS) 48 consists of a plurality of multiple-bit registers to provide fast internal storage to the CAU, and is divided into an odd-address and even-address structure to allow simultaneous referencing of double word lengths to provide for the accommodation of double-precision instructions. The Operand Address Generation circuitry 44 directs requests to the GRS over line 50, and receives information on line 52. Once the absolute address is generated, it is transmitted on line 54 to the Operand Buffer 56. The address is transmitted on line 58 to the MSUI for obtaining the requested operand from the MSU, which in turn transmits it back over line 60 to the Operand Buffer 56. It should be noted, that the Operand Buffer 56 operates to transfer block of data to minimize the needs of access to the MSU, the details of the block transfers not being set forth since they do not add to an understanding of the invention. The Arithmetic Unit (AU) 62 functions to perform the various arithmetic operations specified by the instructions. The system for handling of floating-point calculations and the improved characteristic adder are encompassed within the AU. The Function Decode and Control 40 provides control signals on line 64 to the AU, and the operands are provided from the Operand Buffer 56 on line 66. Results of the arithmetic operations are transmitted on line 68 to the Operand Buffer. The AU also receives input data from the GRS 48 on line 70, and provides interim storage to the GRS over line 72. The Function Decode and Control provides selection signals on line 74 to the GRS. The GRS 48 also is capable of transmitting data on line 76 to the Operand Buffer 56 where it is available for storage in the MSU. The CAU also functions to test for jump conditions through the use of Conditional Jumps circuitry 78, which provides signals on line 80 for altering the instruction address sequence in response to the satisfaction of tested jump conditions. The Conditional Jump circuitry 78 receives input signals from GRS on line 82 which are utilized in the jump evaluation. Once an arithmetic operation has been completed, and in the absence of a conditional jump situation, the Function Decode and Control 40 provides signals on line 84 indicating the completion of the instruction and generating the initiation of the next instruction address.

The Arithmetic Unit 62 includes, as will be described in more detail below, a 1's complement subtractive adder that is capable of segmented adds, a plurality of addressable Accumulators for storing operands and intermediate results of arithmetic computation, a high speed shift matrix, a multiplier for fixed or floating-point multiplication, and circuitry for performing single-or double-precision floating-point arithmetic.

Figure 2:
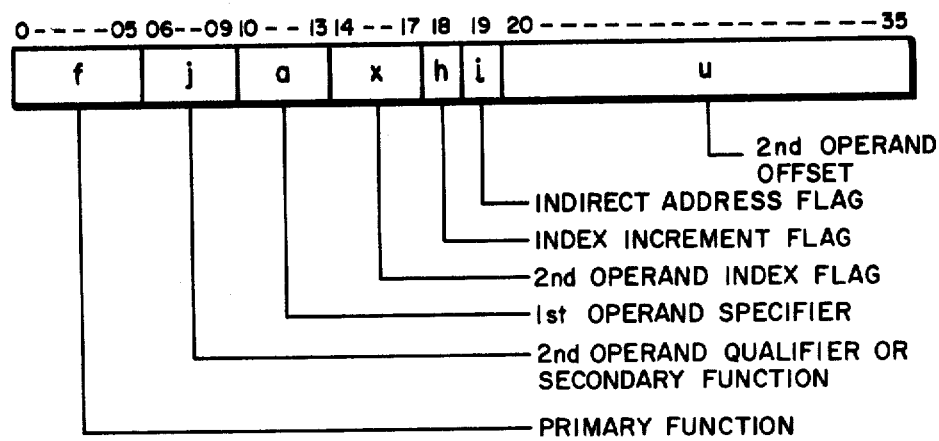
FIG. 2 illustrates the format of the instruction word.

FIG. 2 illustrates the format of the instruction word for the embodiment of the data processing system which incorporates the subject invention. The instruction word utilizes 36-bits organized into several distinct parts of designators. The various field and designators will be discussed in order starting from the left and proceeding to the right-most end of the instruction word. The f-field represents the function code of the command operation to performed by the computer. Illustratively, the f-field may hold the bit combination for dictating that the computer should perform an add operation, a jump operation, a floating-point instruction, and the like. The function code for the most instructions utilizes 6-bits; however, for certain operations, the j-field is also combined as part of the function code. This expands the capacity to distinguish between the specific operations. The j-field is 4-bits and it utilizes this control as the partial-word transfer designator. In its normal operation, the j-field determines whether an entire data word or only a specified part of a data word is to be transferred to or from the CAU. As previously mentioned, in certain instructions, the j-field serves as an additional part of the function code designator. When the j-field is utilized in its normal function, it specifies which half-word, third-word, or sixth-word is to be used. When reading from the MSU, the transfer is always into the least significant position of the register in the CAU. In transfers from the CAU, the j-field specifies to which word, half-word, third-word, quarter-word, or sixth-word, the least significant portion of the word to be transferred from the CAU will be made. Bit positions within the specified address in MSU which are not involved in the transfer are not changed. For various combinations of sign extension or lack of the j-field, the u-field of the instruction becomes the effective operand rather than the address of the operand as is the normal case. The a-field is four-bits and is termed the A-register designator. For normal operation, the a-field specifies one of a plurality of A-Registers and in some special cases it can also specify one of a plurality of other Registers. These special registers are addressable locations within the CAU in the GRS. Other operations concerned with the a-field are not relevant to the subject invention and will be described. The x-field is four-bits and is used to reference any one of the index registers that are contained in the GRS. When the modification of the u-field is specified, the index registers referred to as X-Registers. When the x-field is set to zero, modification to the u-field will not take place. If the x-designator is coded with a numerical value, the corresponding Register is referenced and its contents are added to the u-field to form the effective address. The formation of the absolute address may also involve the use of further base address addressing, and will not be described in detail. The h-field is one-bit and is termed and incrementation designator. The i-field is one-bit and is used for indirect addressing.

Figure 3:
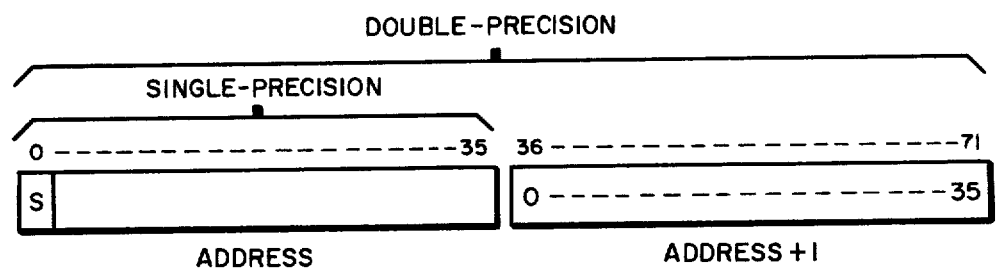
FIG. 3 illustrates the form of the data operands.

FIG. 3 represents the form of operands, other than instruction operands. For this embodiment, the single-precision data operand is comprised of 36-bits, numbered from 00 through 35 commencing from the most significant bit position and progressing to the least significant bit position. The zero-bit position is the sign of the data word, with a 0 representing a positive value and a 1 representing a negative value. For positive values, 1's in the remaining bit positions are significant in the determination of the numerical value. If the sign bit contains a number 1, the negative word exists, and 0's in the remaining bit positions represent significant data in determining the value of the negative number of the relationships in Example I illustrate these concepts.

EXAMPLE I

Assume a 6-bit word:

| sign | data |
|---|---|
| +5 = 0 | $00101_2$ |
| −5 = 1 | $11010_2$ |

The preferred embodiment that incorporates the subject invention utilizes 1's complement for performing binary arithmetic. As is well known, the 1's complement of a binary number is formed by changing all 1's in the word to 0's and changing all 0's in the word to 1's. An arithmetic data word of positive value, when complemented, becomes the negative value of the word; and, a negative value when complemented, becomes the positive value of the word. Example II illustrates the 1's complement system.

EXAMPLE II

Assume a 6-bit word:

| |
|---|
| +5 = $001101_2$ = complement of $111010_2$ (−5) |
| −5 = $111010_2$ = complement of $000101_2$ (5) |

The absolute value of an arithmetic number is the numerical value of the number regardless of sign, as illustrated in Example III.

EXAMPLE III

| Binary Value | Absolute Value |
|---|---|
| +14 = 001110 | 001110 = 14 |
| −14 = 110001 | 001110 = 14 |

A double-precision data word is generated by considering two words of 36-bits each as a single operand. The most significant portion of the double-precision word is located at an address, and the least-significant half of the data word is located at the address plus 1. When operating as double-precision operands, the bits are considered sequentially from 00 through 71.

In the processor illustrated and described in FIG. 1, a positive mantissa, that is the numeral value of the data, is alway considered to be a fraction. When normalized, the leading bit of the mantissa is equal to 1 and the value of a positive mantissa will always fall between 1 and $\frac{1}{2}$ inclusive. A negative mantissa is normalized when the leading bit of the mantissa is equal to 0, and the value of a negative mantissa will always fall between the value of 1 and $\frac{1}{2}$ inclusive. As mentioned above, the arithmetic system is capable of operating on two forms of floating-point operands, that is, single-precision and double-precision. Single-precision instructions produce double-precision results, i.e., an operand of twice the capacity of the standard AU register length. Double-precision arithmetic instructions also produce double-precision or double-length results. FIG. 4 illustrates the format of the single-precision operand for the embodiment of the subject invention. The single-precision mantissa S-M is 27 bits and is stored in register bit position 9 through 35. The single-precision characteristic S-C is 8-bits and resides in a storage register bits 1 through 9. The sign S resides in a bit position 0. The mantissa S-M is the numerical value of the data and, as stated above, is always considered to be a fraction. It should be noted that the characteristic S-C is not the exponent of the mantissa; but, instead, is the exponent of the numerical base.

FIG. 5 illustrates the format of a double-precision operand. It will be noted that two full registers are utilized to store the double-precision operand. Recalling from above that a single-precision operand is illustratively shown as 36-bits, the double-precision operand requires 72-bits to completely define it. The least significant portion of the double-precision mantissa D-M is stored in the 36-bits which are designated as the address +1. The most significant portion of double-precision mantissa D-M are stored in the 24 lower ordered bit positions of the designated address. The composite portion of the address and the entire address +1 results in a 60-bit double-precision mantissa. The double-precision characteristic D-C is 11-bits in capacity and resides in bit positions 1 through 11 of the address. The sign of the mantissa S is located in the highest ordered bit position of the address.

Both the characteristic and mantissa for floating-point arithmetic operations, whether they be single- or double-precision, may represent positive or negative values. The sign bit S denotes the sign of the mantissa, and will be described in more detail below. To avoid using two separate signs, that is, one for the characteristic and one for the mantissa, within the same word, a system of characteristic biasing is employed to indicate the sign of the characteristic.

For single-precision, this consists of adding to the true or unbiased characteristic the bias value of 128 ($200_8$). The 8-bit characteristic permits a range of −128 to +127 (−$200_8$ to +$177_8$) as shown in Table I.

TABLE I

| SINGLE-PRECISION [Characteristic Values] | | | |
|---|---|---|---|
| Decimal | | Octal | |
| True | Biased | True | Biased |
| −128 | 000 | −200 | $000_8$ |
| 000 | 128 | 000 | $200_8$ |
| +127 | 225 | 177 | $377_8$ |

To illustrate the principles involved, the value $.75_{10}$ × $2^3$ is presented with every possible combination of signs.

Single Precision:

| 1. .75 × $2^3$ | .75 × $2^3$ (unbiased) | = 003 600 000 $000_8$ |
|---|---|---|
| | Bias | = 200 |
| | .75 × $2^3$ | = 203 600 000 $000_8$ |
| 2. −.75 × $2^3$ | .75 × $2^3$ (unbiased) | = 003 600 000 $000_8$ |

TABLE I-continued

SINGLE-PRECISION
[Characteristic Values]

| | | Bias | = 200 |
|---|---|---|---|
| | | $.75 \times 2^3$ | = 203 600 000 000$_8$ |
| | | 1's complement | |
| | | $-.75 \times 2^3$ | = 574 177 777 777$_8$ |
| 3. | $.75 \times 2^{-3}$ | $.75 \times 2^{-3}$(unbiased) | = (−3)600 000 000$_8$ |
| | | Bias | 200 |
| | | $.75 \times 2^{-3}$ | = 175 600 000 000$_8$ |
| 4. | $-.75 \times 2^{-3}$ | $.75 \times 2^{-3}$(unbiased) | = (−3)600 000 000$_8$ |
| | | Bias | = 200 |
| | | $.75 \times 2^{-3}$ | 175 600 000 000$_8$ |
| | | 1's Complement | |
| | | $-.75 \times 2^3$ | = 602 177 777 777$_8$ |

For double-precision, the true or unbiased characteristic is added to a bias value of 1024, (2000$_8$). The 11-bit characteristic permits range of values shown in Table II.

TABLE II
DOUBLE-PRECISION
[Characteristic Values]

| Decimal | | Octal | |
|---|---|---|---|
| True | Biased | True | Biased |
| −1024 | 0000 | −2000 | 0000$_8$ |
| 0000 | 1024 | 0000 | 2000$_8$ |
| +1023 | 2047 | 1777 | 3777$_8$ |

Double-Precision:
1. $.75 \times 2^3$

| | $.75 \times 2^3$ | = 0003 60 000 000 000 000 000 000$_8$ |
|---|---|---|
| | Bias | = 2000 |
| | $.75 \times 2^3$ | = 2003 60 000 000 000 000 000 000$_8$ |
| 2. $-.75 \times 2^3$ | | |
| | $-.75 \times 2^3$ | = 0003 60 000 000 000 000 000 000$_8$ |
| | Bias | = 2000 |
| | $-.75 \times 2^3$ | = 2003 60 000 000 000 000 000 000$_8$ |
| | 1's Complement | |
| | $-.75 \times 2^3$ | = 5774 17 777 777 777 777 777 777$_8$ |
| 3. $.75 \times 2^{-3}$ | | |
| | $.75 \times 2^{-3}$ | = (−3) 60 000 000 000 000 000 000$_8$ |
| | Bias | = 2000 |
| | $.75 \times 2^{=3}$ | = 1775 60 000 000 000 000 000 000$_8$ |
| 4. $-.75 \times 2^{-3}$ | | |
| | $.75 \times 2^{-3}$ | = (−3) 60 000 000 000 000 000 000$_8$ |
| | Bias | = 2000 |
| | $.75 \times 2^{-3}$ | = 1775 60 000 000 000 000 000 000$_8$ |
| | 1's Complement | |
| | $-.75 \times 2^{-3}$ | = 6002 17 777 777 777 777 777 777$_8$ |

The foregoing illustrated biasing of the single-precision and double-precision characteristics allows negative or positive excursions from the medium bias value. This biasing system permits the direct addition or subtraction of the mantissa and characteristics of two floating-point operands and permits the negative of a given positive value to be formed by calculating the 1's Complement value for the positive operand.

When the single-precision operand is unpacked for manipulation, the characteristic S-C is taken in its magnitute form and shifted right three places so that it can be manipulated in the 12-bit characteristic adder that will be described in more detail below. In this shifting process, bit positions 0 through 3 are filled to 0's. The sign S of the single-precision word is filled into bit positions 0 through 8 and combined with the mantissa S-M as an operand ready for consideration by the AU. When a single-precision operand is to be packed, that is to be recombined, after a floating-point operation, the 8-bit characteristic is utilized in its magnitude form for posi-tive mantissas, and is left-shifted three places to bit positions 1 through 8 of the resultant of floating-point word. The sign S of the resultant calculation is transmitted to the 0-bit position, and the bit positions 9 through 35 of the result of the calculation are packed into bit positions 9 through 35 of the resultant floating-point word. If the sign S of the resultant mantissa is negative, the characteristic is subjected to a 1's complement operation before being shifted and packed into the resultant floating-point word. See Table I for the treatment of biasing and use of true or 1's complement values of the characteristic. Referring again to FIG. 5, the double-precision floating-point operand is unpacked by transferring the magnitude value of the characteristic D-C in direct alignment for use with the characteristic adder. The sign S is filled in bit positions 0 through 11 and combined with bit positions 12 through 35 of the address word. The least significant half of the double-precision operand is derived from the address +1 and is transferred directly as bit positions 36 through 71. The packing process proceeds similarly to that described with regard to the single-precision floating-point operands, with the characteristic being transferred in magnitude form to bit positions 1 through 11 for positive mantissa values. Again, if the mantissa has a negative value, the characteristic is subjected to a 1's complement operation prior to being transmitted to bit positions 1 through 11. The sign S of the mantissa is transferred to bit position 0, and the values of the bit positions 12 through 35 are transferred directly to bit positions 12 through 35 of the address word. Bit positions 36 through 71 are transferred to the address +1 word. The biasing and treatment of positive and negative values is set forth in detail in Table II.

Figure 6B:
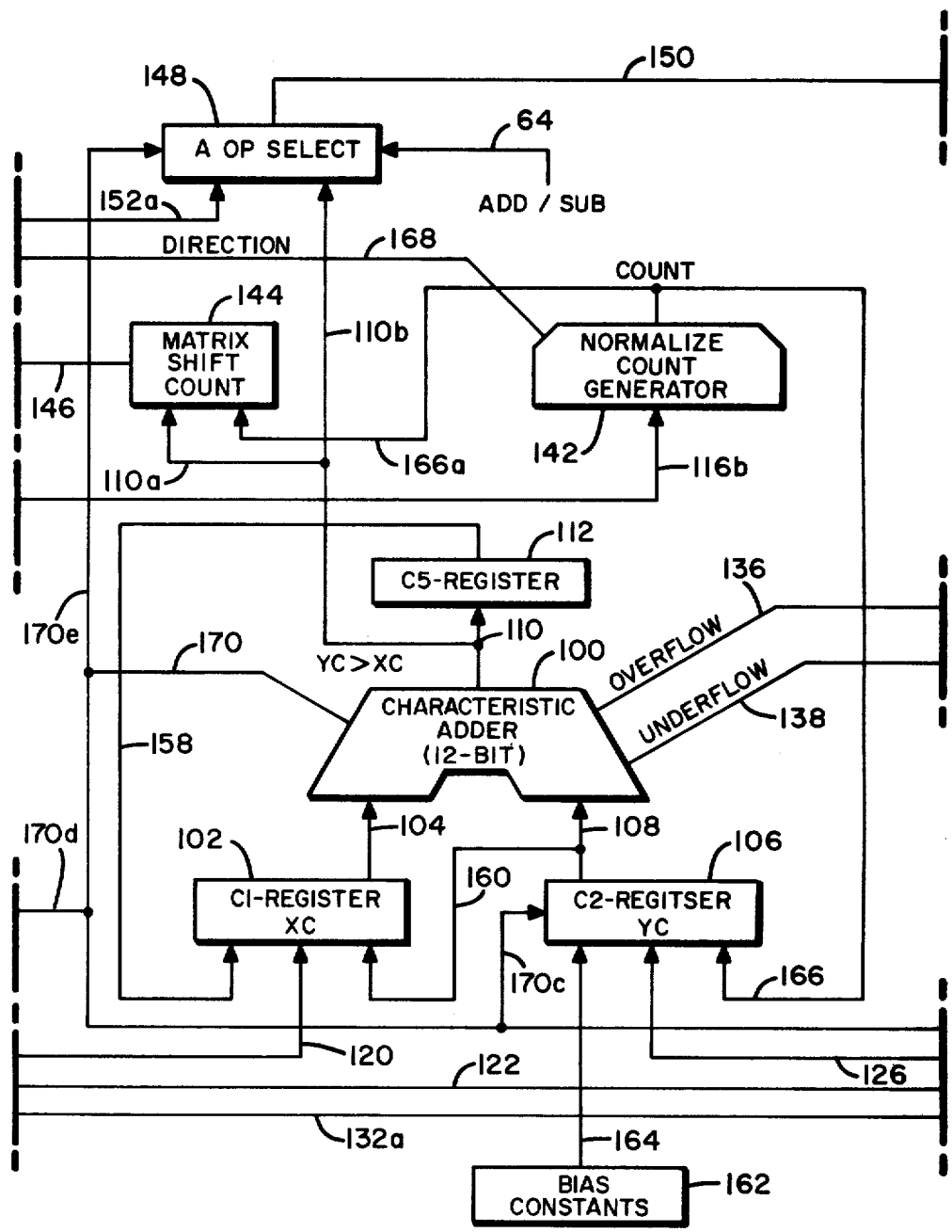
Figure 6C:
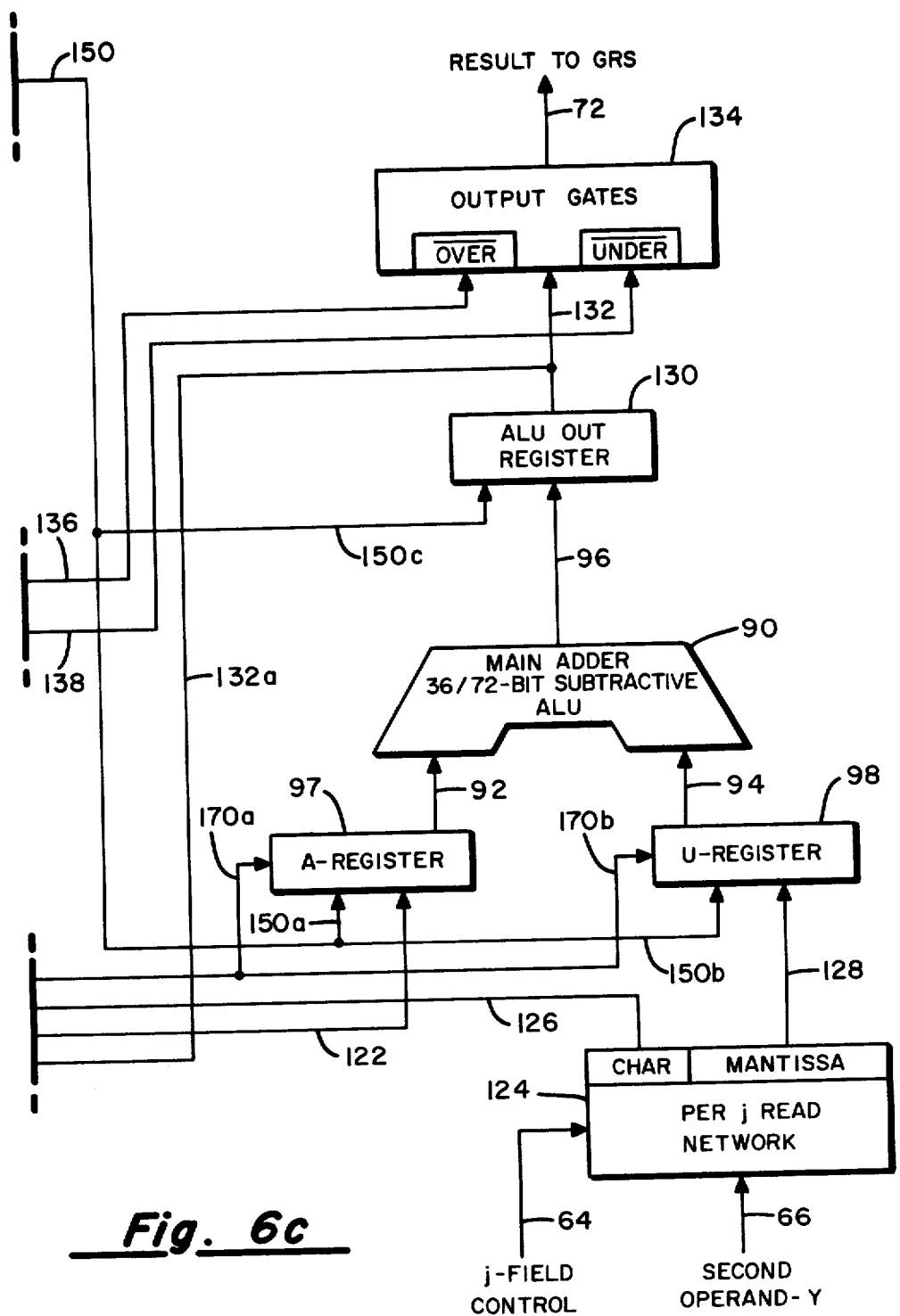

FIG. 6a through FIG. 6c, when arranged as shown in FIG. 6, comprise a block diagram of the portion of the Arithmetic Unit 62 that is utilized in the floating-point arithmetic operations, and including the adder of the subject invention. The system utilized a Main Adder, referred to as ALU, 90, which is capable of performing addition of operands received in parallel on lines 92 and 94, and forming the sum output on line 96. The ALU is a subtractive adder of a type known in the art, capable of performing single-precision addition of two 36-bit operands, double-precision addition of two 72-bit operands, as well as capable of performing simultaneous additions or subtractions of operands partitioned as half-words, or third words. The ALU is utilized in floating-point arithmetic operations to form the sum or difference of the mantissa portions of the floating-point operands. One set of inputs is applied from the A-Register 97 and the other operand is provided by the U-Register 98. It is understood that 36-bit portions of the A-Register and U-Register are utilized for the single-precision operation, while each of these registers is comprised of 72-bits for the double-precision calculations. The Characteristic Adder 100 comprises a 12-bit subtractive adder, which will be described in detail below. The Characteristic Adder 100 receives a 12-bit set of input signals from the C1-Register 102 on line 104, and the other 12-bit operand from the C2-Register 106 on line 108. The sum is provided on line 110 and is utilized as an input to the C5-Register 112.

The first operand, designated X, is received from GRS on line 70, and is applied as an input to the A Input Register 114, whose output is applied on line 116 as an input to the Per j Store Network 118. In response to the j-Field Control received on line 64, this network unpacks the floating-point operand, as previously described, with the unpacked characteristic being directed on line 120 as an input to the C1-Register 102. The appropriately unpacked mantissa is directed on line 122 as a set of input signals to the A-Register 97. The second operand, designated Y, is received on line 66, and is unpacked by the Per j Read Network 124 in accordance with the dictates of the j-Field Control received on line 64. The unpacked characteristic is directed on line 126 as one set of input signals to the C2-Register 106, and the unpacked mantissa is directed on line 128 as one set of input signals to the U-Register 98.

The sum or difference output signals from ALU 90 transferred on line 96 is stored in the ALU Out Register 130, and are available on line 132 to the Output Gates 134, and on line 132a as a second set of input signals to the A Input Register 114.

Characteristic Adder 110 provides Overflow signals on line 136 to the Output Gates and an Underflow signal on line 138 to the Output Gates 134. When there is neither an Overflow or Underflow condition, the Output Gates will be satisfied, and the signal received on line 132 will be passed out to GRS on line 72.

The output signals from the A Input Register 114 are provided on line 116a as one set of input signals to the Shift Matrix 140, and on line 116b to the Normalize Count Generator 142. The Shift Matrix is utilized in aligning the mantissa portions of the floating-point operands prior to execution of the arithmetic operations, and is further utilized in the normalization of the resultant floating-point mantissa. The output signal from the Characteristic Adder 100 is provided on line 110a as one set of input signals to the Matrix Shift Count circuitry 144, which provides shift count control signals on line 146 to control the functioning of the Shift Matrix. The Characteristic Adder output signals are also applied on line 110b as input signals to the A OP Select circuitry 148. The output of this circuitry is provided on line 150, and is directed on line 150a as one set of input signals to the A-Register 97, and on line 150b as one set of input signals to the U-Register 98, and on lines 150c as one set of input signals to the ALU Out Register 130. As will be described in more detail below, the control signals received on line 64 will determine whether or not the output signals on line 150 will be transmitted as true or complement, dependent upon whether the selection is for addition or subtraction.

The output of the Shift Matrix 140 is provided on line 152 to the A Wrap Register 154 and on line 152a to the A OP Select circuitry 148. The output signals from the Per j Store Network 118 provided on line 68 as output to the buffer, are also provided on line 68a as an input to the A Wrap Register 154. The output provided therefrom on line 156 is directed as another set of input signals to the A Input Register 114.

The output signals from the C5-Register 112 are directed on line 158 as a set of input signals to the C1-Register 102. The output signals from the C2-Register 106 are directed as yet another set of input signals to the C1-Register 102 on line 160. The C2-Register 106 is adapted to receive the Bias Constants 162 on line 164, and receives the output signals from the Normalize Count Generator 142 on line 166. This count signal is also applied on line 166a as one set of input signals to the Matrix Shift Count circuitry 144.

The Normalize Count Generator 142 provides a signal as to whether the shift is right or left for normalization on line 168 to control the operation of the Shift Matrix 140 during the normalization process.

The Characteristic Adder 100 provides a signal on line 170 that determines whether the characteristic XC of the first operand is greater or smaller than the characteristic YC of the second operand. This control signal is utilized as a control signal on line 170a to the A-Register 97, on line 170b as a control to the U-Register 98, as a control on line 170c to control the operation of the C2-Register 106, as a control on line 170d to the A Input Register 114, and as a control on line 170e to the A OP Select circuitry 148.

While it is understood that the Arithmetic Unit 62 is capable of performing a full range of floating-point instructions, the description of the detailed operation of the system will be directed to considering adding and subtracting, since these functions illustrate the novel and advantages operation of the improved Characteristic Adder. The functions of the add and subtract instructions are illustrated in Table III.

TABLE III f j
76,00 Single-Precision Floating Add (FA)
$(A_a) + (U) \rightarrow A_a$
76,00 Single-Precision Floating Add Negative (Subtract) (FAN)
$(A_a) - (U) \rightarrow A_a$
76,10 Double Precision Floating Add (DFA)
$(A_a, A_{a+1}) + (U, U + 1) \rightarrow A_a, A_{a+1}$
76,11 Double-Precision Floating Add Negative (Subtract) (DFAN)
$(A_a, A_{a+1}) - (U, U + 1) \rightarrow A_a, A_{a+1}$ In this configuration, the f-Field of the instruction word designates the function code, and is 76 for the floating-point instructions. The j-Field is specified in Table III and comprised the designations that control the functioning of the packing and unpacking of the floating-point operands. In Table III, the $A_a$ designates the A-Register in the GRS specified by the a-Field, and the U designates the absolute address of the second operand determined by the translation of the instruction word together with its indexing.

Before describing the Characteristic Adder in detail, its functioning within the total arithmetic system will be described with reference to a basic single-precision floating-point add sequence. It should be understood that the operation of the Arithmetic Unit 62 is subjected to timing and control pulses as necessary for the particular type of circuitry utilized to implement the system. This timing and control is well understood, and is not shown in detail since it does not add to an understanding of the invention, and further can be readily derived by those skilled in the art. The following steps occur in sequence with the functional steps having been designated for purposes of reference by the letter T. It should not, however, be considered that these sequential steps necessarily occur at specific timing pulses so designated, but instead, should be considered to be sequences that occur in the order set forth.

T1 Sequence. The first operand X is received on line 70 from the GRS and is stored in the A Input Register 114. The operand X is directed on line 116 to the Per j Store Network 118 where it is unpacked. The characteristic XC is right-justified in a 12-bit field and is directed in magnitude form on line 120 to the C1-Register 102. The Characteristic Adder is of a 12-bit capacity for this embodiment, and is utilized for both the single-precision and double-precision characteristics. The use of 11-bits for the double-precision characteristic makes it necessary to provide the right shift of the single-precision characteristic so that it functions properly in the Adder. During unpacking, the mantissa is sign-filled and directed as a 36-bit operand on line 122 to the A-Register 97. The details of the functioning of the Per j Store Network 118 as controlled by the j-Field control received on line 64 will not be described in detail since it does not add appreciably to an understanding of the functioning of the Characteristic Adder.

T2 Sequence. The second operand Y is received on line 66 and is unpacked as directed by the Per j Read Network under direction of control received from the j-Field control on line 64. Unpacking occurs in a manner similar to that just described. The characteristic YC is right-justified and provided on line 126 as input to the C2-Register 106. The characteristic is transferred in magnitude form. At the same time the mantissa of the Y operand is sign-filled and transferred on line 128 to the U-Register 98. When the C1-Register and the C2-Register have both been loaded, the Characteristic Adder subtracts YC from XC and produces the difference in magnitude form on line 110. Simultaneously, a signal is provided on line 170 which indicates whether XC or YC is the smaller of the two.

T3 Sequence. The magnitude of the characteristic difference is loaded into the Matrix Shift Count Register 144, where it is utilized for controlling the Shift Matrix 140 in the alignment of the appropriately selected one of the mantissa operands under consideration. If YC is smaller than XC the control signal on line 170 causes the contents of U-Register to be transferred through ALU 90 to the ALU Out Register 130, where it is then transferred to the A Input Register 114. The Shift Matrix 140 is placed in a right-shift sign-fill shift mode to align the smaller mantissa to the larger, and the contents of the A Input Register 114 is directed on line 116a to the Shift Matrix for alignment in accordance with the count provided from the Matrix Shift Count 144. The output of the Shift Matrix 140 is directed on line 152a to the A OP Select 148. If it had been determined that YC is greater than XC, it would indicate that the X operand would have to be shifted for alignment. In this mode of operation, the U-Register 98 would remain unaltered since it would contain the properly aligned mantissa. In this operation, the unpacked and sign filled mantissa for operand X which had been directed from the Per j Store Network 118 on line 68a to the A Wrap Register 154, would then be re-introduced on line 156 to the A Input Register 114. Thereafter, it would be subjected to the Shift Matrix and shifted under control of the Matrix Shift Count and directed to the A OP Select 148. In this manner, it can be seen that the smaller value operand is selected and is shifted for appropriate alignment.

T4 Sequence. The appropriately positioned mantissa stored in the A OP Select 148 is available on line 150 to the A-Register 97 and the U-Register 98. It will be recalled that the A-Register was originally loaded with the X operand mantissa and the U-Register 98 was originally loaded with the Y operand mantissa. If it was determined that YC is greater than XC, the signal on line 170a would direct the appropriately shifted X operand mantissa to the A-Register 97. Alternatively, if it was determined the XC was greater than YC, the control signal on line 170b would control the transfer of the appropriately shifted Y operand mantissa on line 150b to the U-Register 98. In either case, the unshifted mantissa is stored and available in the other register. At this time, the Main Adder 90 causes the addition (or subtraction for subtract instructions) in 1's complement form to be produced on line 96, thereby producing the unnormalized sum (difference) which is stored in the ALU Out Register 130. In order to select and retain the larger characteristic, an evaluation is made such that if XC is greater YC the contents of the C1-Register 102 and the C2-Register 106 are unaltered. However, if YC is greater than XC, YC is transferred on line 160 to the C1-Register.

T5 Sequence. The sum (difference) mantissa is transferred from the ALU Out Register 130 on line 132a to the A Input Register 114. This sum is transferred on line 116b to the Normalize Count Generator 142 where it is evaluated for determination of the shift count and direction necessary to normalize the mantissa. The shift count is directed on line 166a to the Matrix Shift Count 144, and is directed on line 166 to the C2-Register 106. The unnormalized mantissa is directed on line 116a to the Shift Matrix 140. The direction of shift is selected by the signal on line 168. The combination of the direction and the shift count provided on line 146 causes the Shift Matrix to normalize the mantissa. The normalize mantissa is transferred on line 152a to the A OP Select 148.

T6 Sequence. The resultant characteristic is adjusted according to the normalization of the resultant mantissa. It will be recalled that the larger of the two characteristics has been established in the C1-Register 102. The normalization count has been stored in the C2-Register 106. If a right shift normalization was specified, the Characteristic Adder 100 performs addition of the two input terms. If a left shift was specified for normalization, the Characteristic Adder subtracts the contents of the C2-Register from the C1-Register. At this time, characteristic overflow or characteristic underflow is tested. Overflow is indicated by a signal on line 136 and results if an add is performed for right normalization and the resultant characteristic has a 1 in any of bit positions 1, 2, or 3. Underflow results in a signal on line 138, and occurs if a subtract for left renormalization is performed and the resultant characteristic is negative as indicated by a 1 in the 0-bit position. If neither of these conditions occur, the resultant characteristic is within the permissible range. If the resultant mantissa is negative, the adjusted characteristic is complemented by the Characteristic Adder. For a single-precision floating-point add or subtract operation, the resultant characteristic, either or true or complemented, is then shifted left three places in preparation for repacking. This finally selected and shifted characteristic is transferred on line 110b to the A OP Select 148.

T7 Sequence. The merged floating-point operand comprising the adjusted characteristic and the renormalized mantissa is transferred on line 150c to the ALU Out Register 150. The output of this register is directed on line 132 to the Output Gates 134. If there is neither an overflow signal on line 136, nor an underflow signal on line 138, the Output Gates 134 will be enabled and the result of the floating-point operation will be transferred on line 72 for storage in the GRS.

The T Sequences should not be considered to be discrete timing sequences, but instead, are intended to describe the various functions that occur and their sequential relationship. The precise circuit timing would be readily developed by those skilled in the art, and would depend upon the type of circuitry utilized in the implementation. From the description of the floating-point add, it can be seen that the characteristic adder is utilized in the functions of calculating a shift count for aligning the smaller operand, determining the resultant characteristic following the completion of the operation, providing the 1's complement of the characteristic for a negative mantissa, providing the magnitude value of the characteristic during calculation, indicating characteristic underflow and overflow, and providing for automatic shifting of the characteristic for repacking. In addition to these functions, the characteristic adder includes provisions for providing the 1's complement of the input signal, or not providing the 1's complement of the input signal depending upon whether an add or subtract operation is to be performed. Further, the characteristic adder provides an evaluation of the calculation when it is to be used as a shift count for mantissa aligment, that indicates a requested shift count that would exceed the capacity of the shift matrix. This would indicate the difference in the two floating-point operands is so great, that when aligned, the smaller would be beyond the range of alignment with the larger. Having described the overall system in which the Characteristic Adder 100 operates, attention will be directed to the specifics and the circuitry utilized to accomplish the purposes and objectives of the invention.

Figure 7:
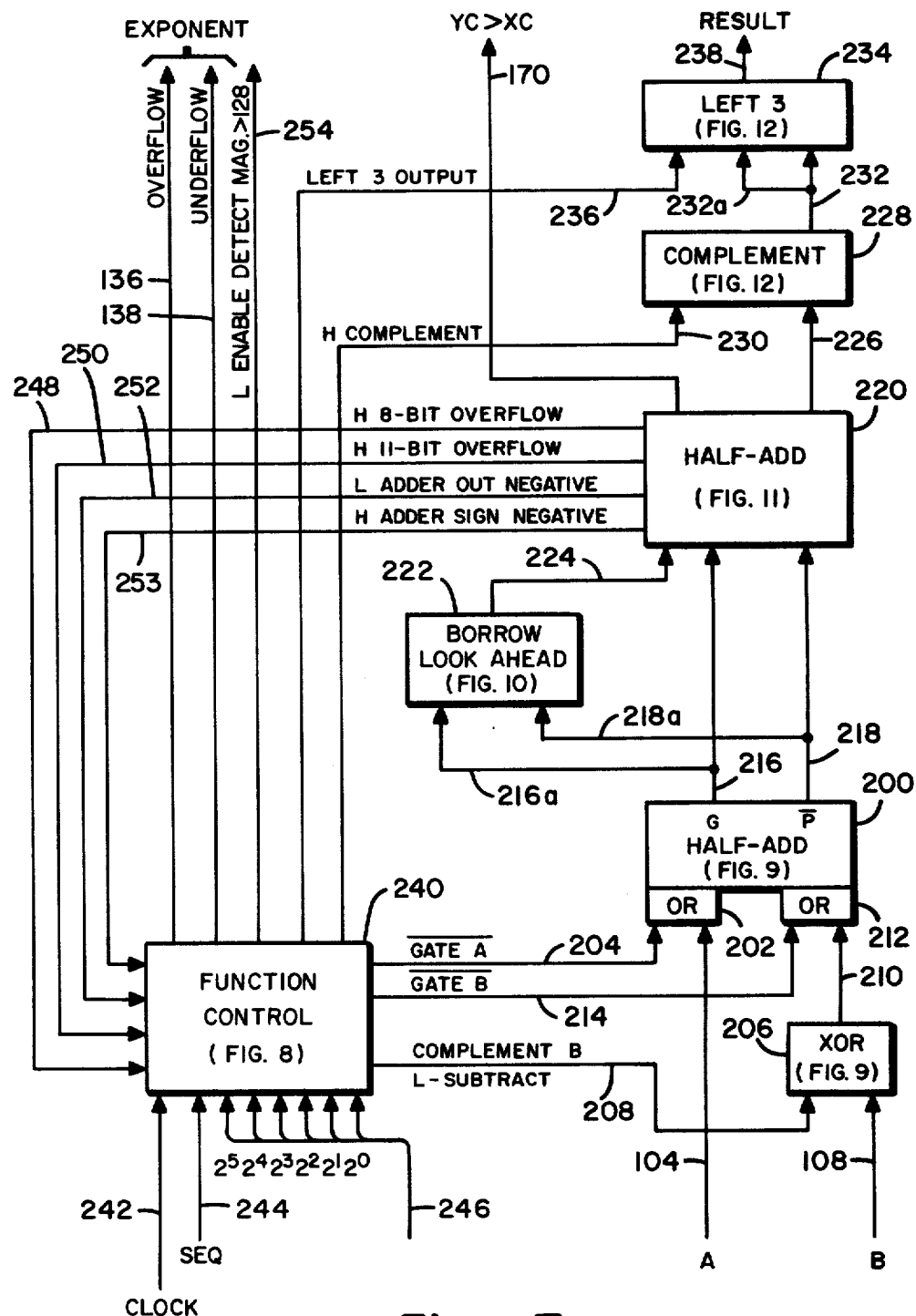
FIG. 7 is a general block diagram of a characteristic adder that embodies and illustrates the invention.

FIG. 7 is a general block diagram of a characteristic adder that embodies and illustrates the invention. In this diagram the various functions are shown within the blocks, and the line terminations in arrowheads indicate the direction of data flow or control flow. The lines will be described, and may be individual control lines or representative of a plurality of parallel data or control lines.

The Characteristic Adder 100 functions as a 1's complement subtractive adder. In general, if a B operand is to be added to a A operand, the system first performs a 1's complement operation on the B operand, and the system then subtracts the 1's complement of the B operand from the A operand. For ease of reference and use in equation representation, the total operand such as the A operand will be simply referred to as A. The 1's complement of the operand will be referred to as A'. Individual bit positions within an operand will be referred to by the operand designation letter followed by a numerical bit position designation. For example, the 0-bit position of operand A would be referred to as A0. The Boolean logic equation conventions relating to the OR, AND, and Inversion functions will be observed.

The system utilizes two half-adders and a borrow network for accomplishing the 1's complement subtractive operation. Half-Add circuitry 200 utilizes 12 half-add circuits that will be described in more detail below, to perform the initial arithmetic function on A and appropriately selected B or B'. The A operand is received on line 104 as a 12-bit operand, and is directed to the OR input circuitry 202 where it is subjected to the control of the signals received on line 204 to determine its application to the Half-Add circuitry. The 12-bit B operand is received on line 108 by the Exclusive-OR circuitry 206, called XOR. Dependent upon the control signal received on line 208, XOR 206 will provide either the true or 1's complement of B on line 210 to the OR 212 input. Control signals received on line 214 will control the transfer of B or B' into the Half-Add circuitry. The Half-Add 200 provides output signals for each of the bits in the 12-bit operands that indicate that a borrow is generated for the associated bit-position together with signals indicative of whether or not the propagate condition is satisfied. The borrow generation signals are referenced collectively as G and are provided on line 216, and the propagate signals are collectively referred to as P and are provided on line 218. These signals are utilized by Half-Add circuitry 220 in the formulation of the final sum. Borrow Look Ahead circuitry 222 receives the G signals on line 216a and the P signals on line 218a for providing output signals on line 224 that are utilized in the calculation of the final sum.

The sum or difference generated in the final Half-Add circuitry 220 is available for output on line 226, where it is directed to Complement circuitry 228. Subject to control signals received on line 230, the resultant sum or difference will either be transferred in its true form or complement form on line 232 to the Left 3 circuitry 234. Subject to the control signals received on line 236, the Left 3 circuitry 234 will either transfer the true or complement value of the sum or difference directly out on line 238, or will cause the result to be shift left three places, as indicated by line 232a. The shifting will depend upon the particular type of floating-point format that is being utilized. It will be recalled that for unpacking single-precision floating-point operands, the characteristic was shifted right three places so that it could be appropriately aligned for use in the 12-bit Characteristic Adder. When the repacking occurs, it is then necessary to shift the resultant characteristic three places left so that it can be put in the appropriate single-precision floating-point word format. However, when double-precision format is utilized, the resultant characteristic need not be shifted for repacking and the direct output on line 238 would be utilized.

It will be recalled that the Characteristic Adder 100 is utilized at various points within the floating-point calculation sequences at various times for calculating shift count information for mantissa alignment, and for calculation of a resultant characteristic. The total system accommodates two floating-point formats, must be able to detect Overflow and Underflow of the Characteristic, must be able to provide the 1's complement of the result, and must signal which of the two input operands is larger. Since the Shift Matrix 140 has a finite shifting capability, the Characteristic Adder also provides a control signal indicative of calculated shift counts that would exceed the maximum shift capability of the Shift Matrix. These various control and operational selections for the Characteristic Adder are accomplished through the Function Control circuitry 240.

The control section of the system provides clock pulses on line 242, which in combination with the Sequence pulses provided on line 244 results in a functioning of the Characteristic Adder in accordance with the Function signals received on line 246. Encoded Function signals provided on line 246 define the various options that are to be selected and executed by the Characteristic Adder. These specific control sequences will be defined in detail in consideration of the detailed circuit arrangements. For example, a specific coded input on line 246 will indicate whether the function is to be an Add or Subtract operation, and will result in the appropriate control output signal on line 208 to select whether the B operand will be complemented or not. At the appropriate time, it issues gating signals on line 204 and 214 for gating the input operands to the Half-Add circuitry 200. The Function signals on line 246 will define whether or not the result must be complemented, and will issue a Complement signal on line 230 when complementation is required. Similarly, the Function will specify the format being utilized and will issue the Left 3 signal on line 236 indicating that the resultant characteristic must be shifted three places to the left for repacking.

In addition to the externally supplied Function signals, the Function Control 240 utilizes signals fed back from the Half-Add circuitry 220. These are the 8-Bit Overflow received on line 248, the 11-Bit Overflow received on line 250, the Adder Negative signal received on line 252, and the Adder Sign Negative on line 253. The signal indicating that YC is greater than XC is issued on line 170, as previously described. At the appropriate time pursuant to the various signal fed back and the Function signals, the Function Control will provide the Overflow signal on line 136, the Underflow signal on line 138, and the Enable Detect Magnitude greater than 128 signal on line 254. Having described the functional components and their interrelationships that are utilized in the Characteristic Adder, each of the functional components will be described with reference to a specific embodiment. Elements or lines that have been previously described will bear similar reference numerals.

Figure 8:
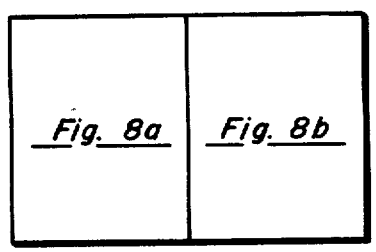
FIG. 8a and FIG. 8b, when arranged as shown in FIG. 8 are a detail logic diagram of the function control.
FIG. 8c illustrates the four possible bit configurations of function signals f1 and f0.
FIG. 8d illustrates the relationship of function signals f3 and f2 and functions controlled.
FIG. 8e illustrates the functions of the setting of f4 function control signals.
FIG. 8f illustrates the f5 function selections.
Figures 8A, 8E, 8F:
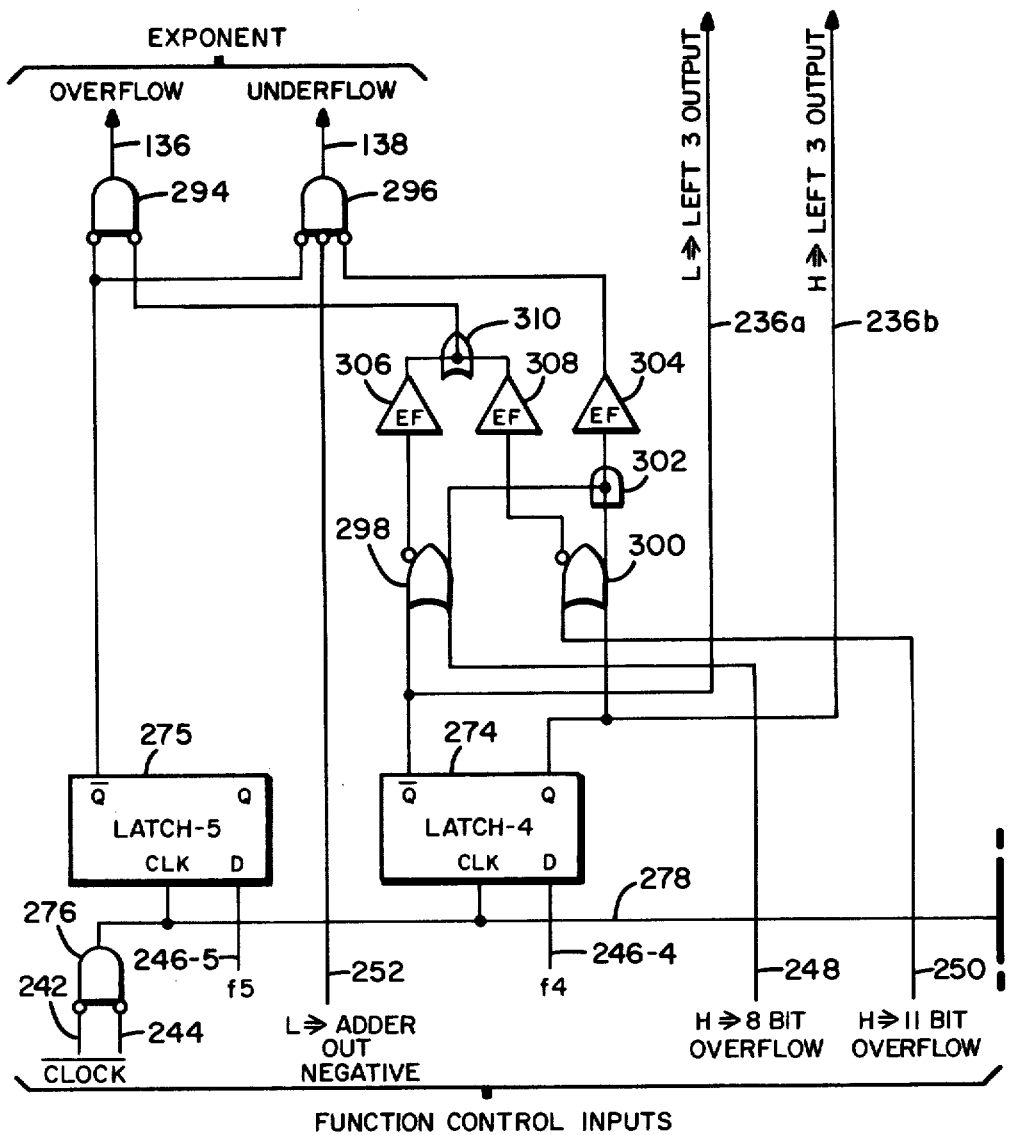
Figures 8B, 8C, 8D:
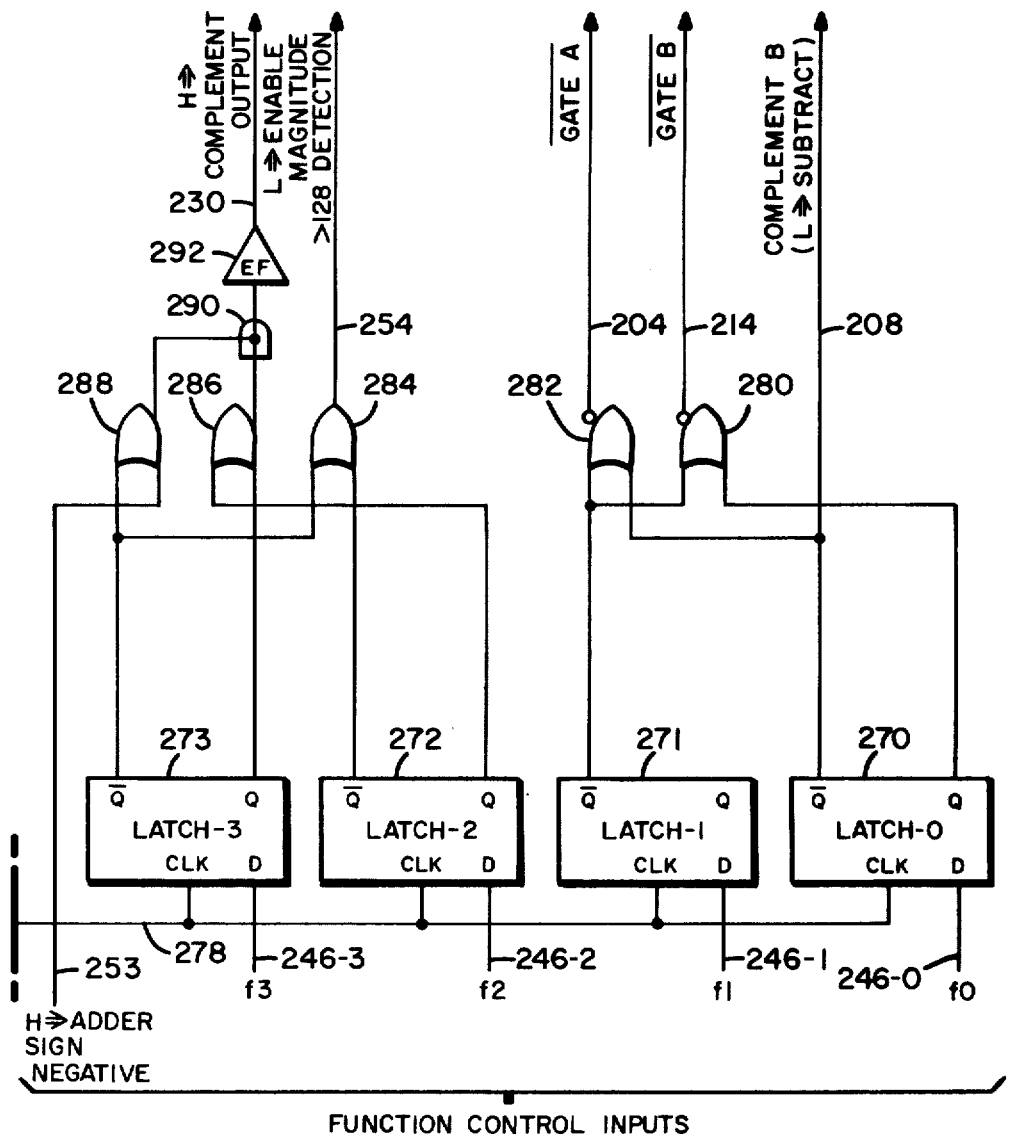

FIG. 8a and FIG. 8b, when arranged as shown in FIG. 8, are a detailed logic diagram of the Function Control. In the consideration of the detail logic, certain conventions will be followed. A logical 1 will be the equivalent of a High signal, and a logical 0 will be the equivalent of a Low signal. The logic symbols are conventional, and represent circuits that will accomplish the logical function represented. The triangular shaped symbol represents an emitter-follower, and are utilized for providing additional power drive without inversion of the input signals. The symbols having straight bottom and rounded top represents a logical AND function, and may show straight line input terminating at the input column or dot connected within the symbol. The straight line input or the dot connection represents a High AND, and results in a High output signal when all input signals are High. The open circles adjacent the input terminals indicate that the circuit responds to Low signals. Accordingly, two input lines terminating in open circles adjacent the input indicates a Low AND function whereby the output signal is Low only when both input signals are Low. The open circle at the output of the symbol indicates inversion of the resultant signal. For example, if a High AND function is satisfied, the straight line output will be a High signal and the signal at the circle will be Low. If the conditions are not satisfied, the reverse conditions will prevail. The symbols having curved input and the curved pointed output represent circuits that perform the logical OR function. The straight line input to the curved input portion of the symbol indicates that the circuit performs the OR function on High signals, resulting in a High output signal when any or all of the input signals are High. The open circle at the output portion of the symbol indicates the inverse of the condition that satisfies the logical function. For example, if the High OR circuit receives a High input signal, the open circle output will provide a Low signal. When the OR symbol has open circle input lines, the logical function is that of providing the OR function of Low signals, and operation is similar to that just described. Other specific types of symbols will be described as they are referenced in the drawings.

The Function Control utilizes 6 Latch circuits 270, 271, 272, 273, 274, and 275. Each of these Latch circuits respond to input signals applied on the D input terminal when appropriately enabled by a Clock signal to cause the Latch circuit to be switched to the state indicated by the input signal. The Latch circuit provides the true output signal at the Q output terminal and the complement value at the output terminal Q. For example, if a logical 1 (High) is applied to the D input terminal of Latch 270, its output terminal Q will provide a 1 signal and its output terminal Q will provide a 0. If a 0 (Low) is applied to the input terminal, the output signals will be reversed for Q and Q. Latch circuits of this type are well known in the art and are available commercially. A detail description of the operation of the Latch circuits is not necessary. Each of the Latch circuits is associated with a respective one of the Function signals. These Function signals are derived from a translation of the f-field for designating the type of floating-point instruction involved, and are further derived from the sequences that are utilized to control each of the floating-point instructions. The details of the generation of the Function signals will not be described in detail, since it does not add to an understanding of the invention. It is sufficient that it be understood that the Characteristic Adder has the ability to perform the various functions that will be described in detail when activated by the appropriate combination of Function Control signals together with the signals that are fed back from the internal calculations within the Characteristic Adder.

Low AND 276 receives the Clock input signal on line 242 and the Sequence signal on line 244, and when both are present (from sources not shown), the output signal on line 278 to all of the Latch circuits functions to allow the Latch circuits to be set by the associated Function signal.

Latch circuits 270 and 271 control the selection of whether an add or subtract operation is to take place, and control the selection of whether A or B will be transmitted through the Adder to the output. FIG. 8c illustrates the four possible bit configurations of Function signals f1 and f0. The state of Latch 270 will determine the signal on line 208 for controlling whether or not B is complemented. A f0 of 0 will result in a High signal on line 208, resulting in B being subjected to 1's complement operation for performing addition by 1's complement subtractive operation. An f0 of 1 will result in a Low signal on line 208 thereby inhibiting the 1's complement operation and causing a subtraction of A minus B. The details of the addition or subtraction will be described in more detail in consideration of the appropriate circuitry below. The capability to select whether A or B will be transferred out is controlled by f1 in conjunction with f0, and is accomplished by OR circuits 280 and 282. OR 280 is coupled to the Q of Latch 271 and to the Q output of Latch 270. OR 282 is coupled to the Q output terminals of both Latches 270 and 271. The complement output of OR 280 controls the transfer of B by the signal on line 214, while the complement output of OR 282 controls the transfer of A by the signal on line 204. When f1 is 0, indicating a normal add or subtract operation, OR circuits 280 and 282 will each receive a High input signal resulting in Low output signals on lines 204 and 214, thereby allowing normal operation of the Adder. However, when f1 is 1, Latch 271 will provide Low input signals OR circuits 280 and 282, thereby allowing the state of f0 to control which of the OR circuits 280 or 282 will receive a High signal for enabling the selection between A and B. In this situation, f0 in the 0 state results in a High signal being applied to OR 282 yielding a Low on line 204, and a Low signal to OR 280 yielding a High on line 214. A High signal on either line 204 or 214 effectively over-rides the associated operand and forces the associated operand to appear as all 1's to the adder, thereby effectively passing the other operand through. This will be described in more detail below.

Latch circuits 272 and 273 are utilized together for controlling the selection of the normal output or the complement output together with the control of the selection of the magnitude out, in response to the state of Function signals f3 and f2. FIG. 8d illustrates the relationship of Function signals f3 and f2 and the functions controlled. OR circuit 284 is coupled to the Q of Latch circuits 272 and 273, and dependent upon their state provides a High output signal on line 254 when either of the associated Latch circuits are set to 0. Only when both Latch circuits 272 and 273 are set 1, will the input signals to OR 284 both be Low thus providing a Low signal on line 254. A Low signal on line 254 is utilized to enable the magnitude detection to determine whether the output of the Adder that is to be used as a shift count is in excess of 128. This will be described in more detail below. OR 286 is coupled to the Q output terminals of Latch circuits 272 and 273. OR circuit 288 receives input signals from the Q output of Latch 273 and from the Adder Sign Negative line 253. The output terminals of OR circuits 286 and 288 are coupled to AND circuit 290 which drives through emitter-follower 292 to the output line 230. When f2 and f3 are both 0, OR circuit 286 will put out a Low signal thereby disabling AND circuit 290 resulting in a Low signal on line 230. This indicates a normal output is selected. When f3 is 0 and f2 is 1, both OR circuits 286 and 288 will receive a High input signal thereby causing AND circuit 290 to be satisfied for providing a High output signal on line 230 resulting in a signal being issued to cause the output to be complemented. Alternatively, if the sign of the Adder output is negative, as indicated by a High signal on line 253, and Latch 272 is set to a 1, the conditions for AND circuit 290 will be satisfied and the result will be complemented. The selection of the magnitude output is under control of Latch 273, and when set to a 1, will activate OR circuit 286. The decision as to whether or not the adder output will be in its proper magnitude form will then depend upon the Adder Sign Negative applied on line 253 to OR circuit 288. When the magnitude selection is made and the resultant sign is negative, both OR circuits 286 and 288 will be satisfied and the conditions of AND circuit 290 will be met and the result will be complemented. In the absence of a negative sign, the magnitude will be the adder output.

Latch 274 is utilized to control the format selection and the left shifting necessary in the 8-bit mode, and is also related to the Overflow and Underflow detection. FIG. 8e illustrates the functions of the setting of Latch 274 by the f4 Function control signals. An f4 0 signal indicates the 11-bit mode while a 1 signal indicates the 8-bit mode and controls the left 3 shifting of the output of the Adder. The Q output terminal of Latch 274 is coupled to line 263b and the Q-output terminal is coupled to line 263a. The use of these left shift signals will be described in more detail below.

The Overflow and Underflow detection is not activated for all of the operations of the Adder. Latch 275 is responsive to the f5 Function control signals for making the basic selection of whether or not Overflow and Underflow detection is to be activated. FIG. 8f illustrates the f5 function selections. A pair of Low AND circuits 294 and 296 are utilized to control the selection of the Overflow and Underflow detections. The Q output terminal of Latch 275 is coupled as one of the input signals to both Low AND circuits 294 and 296. When f5 is a 0 indicating that the detection is disabled, a High signal will be presented to both AND circuits 294 and 296 resulting in a High output signal on line 136 for disabling Overflow detection and a High output signal on line 138 for disabling Underflow detection. When f5 is one, the reverse condition will be met and the Low signal provided by Latch 275 would then enable AND circuits 294 and 296 to be responsive to the evaluation circuitry. It is of course apparent that the Overflow and Underflow conditions will vary depending upon whether the Adder is in the 8-bit mode or the 11-bit mode of operating on characteristics. As mentioned previously, Latch 274 in response to the f4 signal indicates the mode. OR circuit 298 has one input terminal coupled to the Q output terminal of Latch 274 and a second input terminal coupled to the 8-bit overflow feedback line 248. OR circuit 300 has one of its input terminals coupled to the Q output terminal of Latch 274 and a second input terminal coupled to the 11-bit overflow feedback line 250. The true output terminals of OR circuits 298 and 300 are coupled to AND circuit 302 which feeds through emitter follower 304 as one of the input signals to Low AND circuit 296. The complement output terminals of OR circuits 298 and 300 feed through emitter followers 306, and 308, respectively, through OR circuit 310 as the second input to Low AND 294. The Adder Out Negative feedback signal received on line 252 is fed as the third input signal to Low AND circuit 296. When Latch 275 enables OR circuit 296 and the Adder Out Negative signal is Low on line 252, and Underflow condition will be indicated for the conditions when both input signals to OR circuit 298 are Low or when both input signals to OR circuit 300 are Low. Thus when in the 8-bit mode as indicated by f4 and there is no 8-bit Overflow signal on 248, the Underflow signal on line 138 will be generated in response to the Adder Out Negative signal received on line 252. Similarly, when in the 11-bit mode and no 11-bit Overflow signal is received, OR circuit 300 will allow the Underflow to be determined. Low AND circuit 294 determines the Overflow signal on line 136 when enabled by Latch 275. The complement output terminals of OR circuits 298 and 300 respond to the 8-bit Overflow signals on line 248 and 11-bit Overflow signals on line 250, respectively, for controlling generation of the Overflow signals. When f4 is a 1 indicating the 8-bit mode, OR circuit 300 will provide a Low complement output signal to OR 310, and the occurrence of a High signal on line 248 will cause OR circuit 298 to produce a Low complement output signal to OR 310. Since both input signals would be Low for this condition, the Low AND circuit 294 would be satisfied and the Overflow condition would be signaled on line 136. For the condition when f4 is 0 indicating the 11-bit mode, a similar operation occurs, with OR circuit 298 receiving a High signal from Latch 274 and providing a Low output signal through emitter follower 306 to OR 310. The occurrence of the High 11-bit Overflow signal causes OR circuit 300 to provide a Low output signal through emitter follower 308 to OR circuit 310. Since both input signals to OR 310 are Low for this condition, the input requirements for Low AND 294 are satisfied and the Overflow signal is passed out on line 136. For all other combinations of the state of Latch 274 and the state of the signals on feedback lines 248 and 250, the input conditions for Low AND 294 are not satisfied and no Overflow signal will be generated. Further description of various Overflow and Underflow conditions for various types of operations will be described when the detail circuitry is described below.

Figure 9:
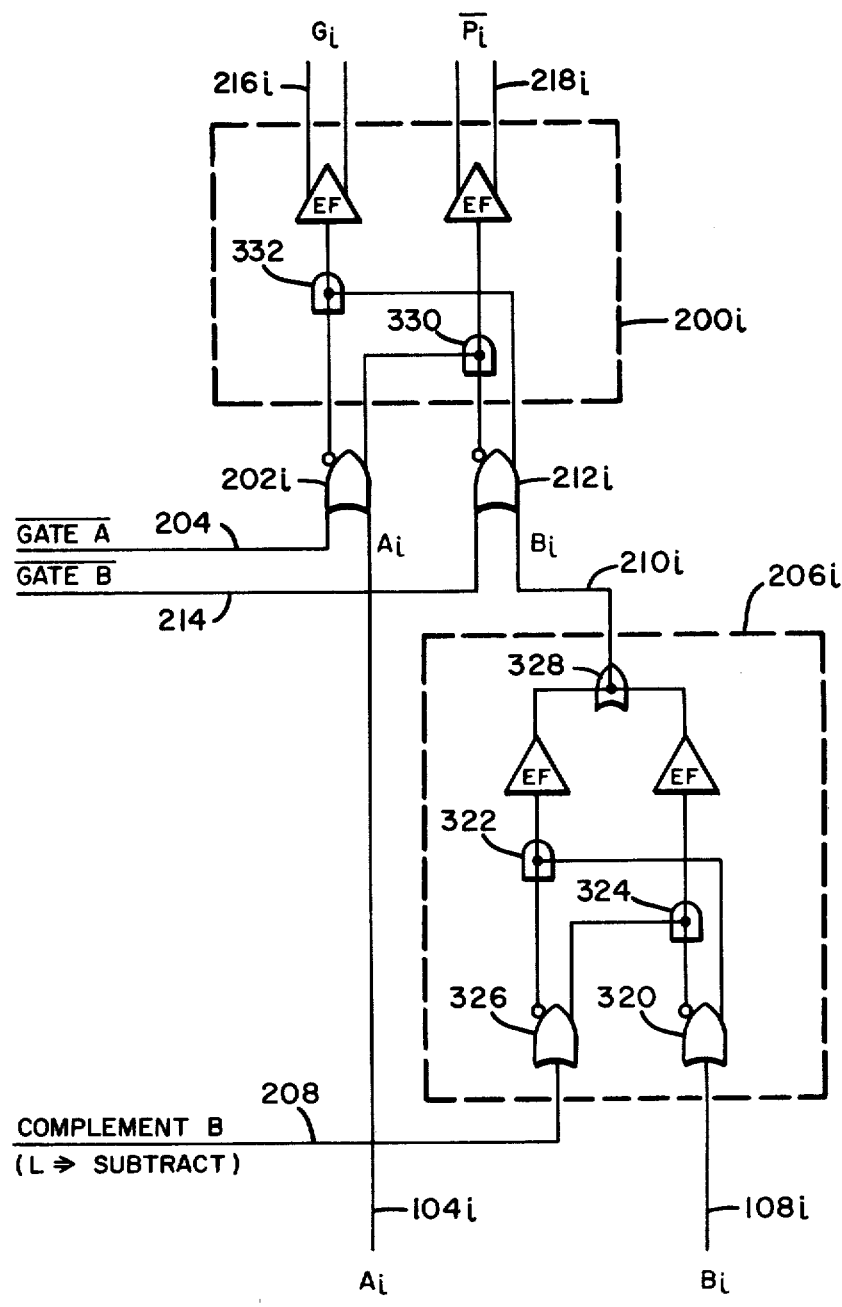
FIG. 9 is a detail logic circuit drawing of a characteristic half-add and associated exclusive-.
Figure 10A:
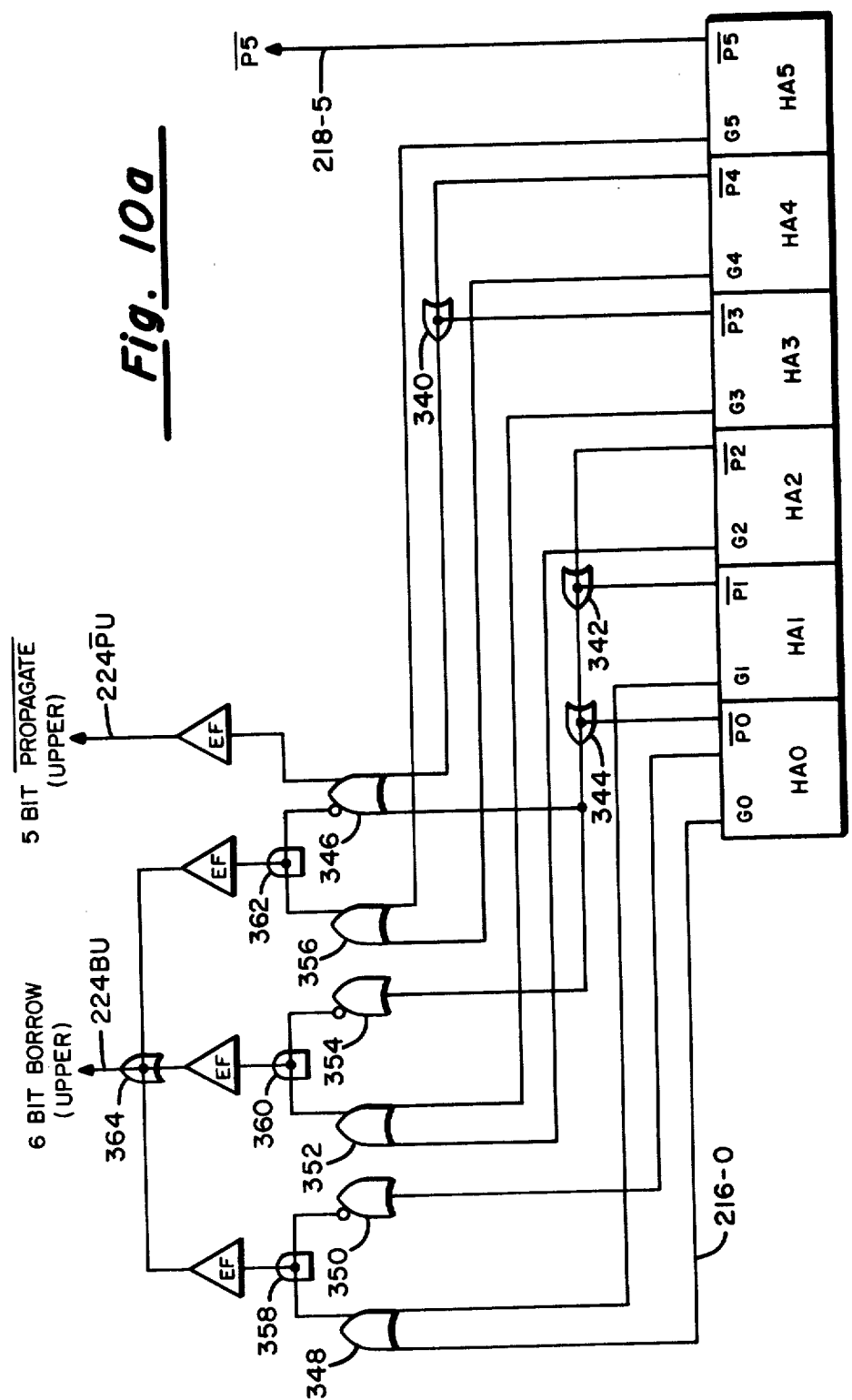
Figure 10B:
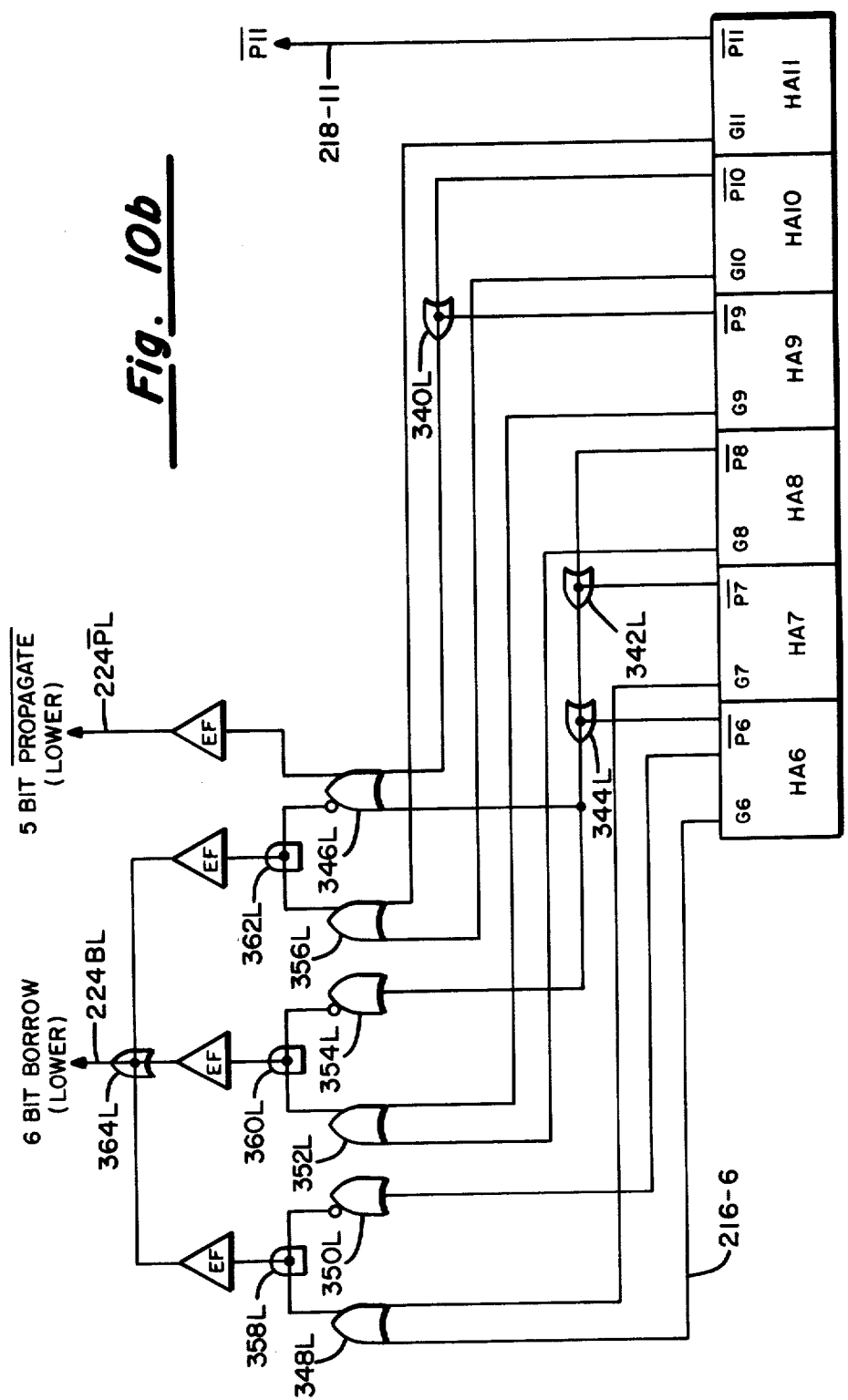

FIG. 9 is a detailed logic circuit drawing of a characteristic Half-Adder and associated Exclusive-OR. It illustrates a characteristic i-bit, it being understood that in a 12-bit Adder, 12 such circuits would be utilized. The i-bit Exclusive-OR is shown enclosed within dashed block 206$i$, and the Half-Adder is shown enclosed within dashed block 200$i$. It will be recalled that it is the function of the Exclusive-OR 206$i$ to determine whether the 1's complement of Bi will be provided for an add operation or whether Bi will be utilized directly for a subtract operation in the subtractive adder. Bi is directed on line 108$i$ to OR circuit 320, the output of which is directed to AND 322, and the complement output of which is directed AND 324. The complement B signal is received by all bit positions on line 208, and for the i-bit is directed to OR circuit 326, the output of which is coupled to AND 324 and the complement output of which is coupled to AND 322. The output signals from AND circuits 322 and 324 pass through respectively associated emitter followers to OR circuit 328. For an add operation, a High signal will be received on line 208 which will pass through OR 326 as a High signal to AND 324, and at the same time a Low signal will be provided to AND 322. If Bi is a 0, a Low signal, OR 320 will provide a Low to AND 322 and a High to AND 324. This combination of signals will result in a High output signal from AND 324 which when applied to OR 328 will result in a High output signal on line 210$i$, and will be the 1's complement of Bi. If Bi is a 1, OR 320 will provide a High signal to AND 322 and a Low signal to AND 324. For this condition, both AND circuits 322 and 324 will provide Low output signals to OR 328, which will result in a Low output signal on line 210$i$. For a subtract operation, line 208 will provide a Low signal to OR 326 which in turn will provide a Low signal to AND 324 and a High signal to AND 322. Thus if a Low signal is received on line 108$i$, the output signals from AND circuits 322 and 324 will both be Low resulting in the Low signal being transferred through OR 328 to line 210$i$. Similarly, if a High is received on line 108$i$, AND circuit 322 will provide a High output signal to OR 328, and the value will be transferred through.

The Ai input signal is directed on line 104 to OR circuit 202$i$, and the Bi or the Bi' is directed on line 210$i$ to OR circuit 212$i$. The output of OR 202$i$ is directed to AND circuit 330 and the complement output is directed to AND circuit 332. The output of OR 212$i$ is directed to AND circuit 332 and its complement output is directed to AND circuit 330. The output of AND 330 passes through an associated emitter follower as the Pi output signal which is referred to as the Not Propagate signal. The output of AND 332 is passed through an associated emitter follower on line 216$i$ as the Gi signal, referred to as the Generate Borrow signal.

The logical functioning of the Half-Add is defined by the following equations, which are definitive of a 6-bit half-adder. It should be understood that the 1's complement computation system is symmetrical and the 12-bit Adder capacity is accomplished by utilizing what is effectively two 6-bit adder networks operated in parallel. Equation 1 defines the Not Propagate condition Pi. Equation 2 defines the conditions for the Generate Borrow condition Gi.

$$Pi = Ai \cdot B'i = \text{Not Propagate} \quad \text{(Equation 1)}$$

$$Gi = Ai \cdot B'i = \text{Generate Borrow} \quad \text{(Equation 2)}$$

$$Gi + Pi = (Ai \cdot B'i) + (Ai \cdot B'i) = Ai + Bi' \quad \text{(Equation 3)}$$

It will be recalled that when the Gate A signal line 204 and the Gate B line 124 both provide Low signals, the Half-Add circuitry is allowed to function on the operands Ai and Bi according to the type of instruction in operation. When either line 204 or 214 provide a High signal, one or other of the input operands will be over-ridden. For example, if a High signal is received on line 204 by OR circuit 202$i$, it will be forced to provide a High output to AND 330 and a Low output to AND 332. Since these signals are forced by the High input, it will appear effectively as though the entire A operand is comprised of 1's. This appears as a negative 0 and upon completion of the subtractive add will effectively amount to transferring the B operand through the Adder circuitry. Similarly, if a High signal is received on line 214, the OR circuits 212 will all be forced High thereby ignoring the entire B operand, thereby making the B operand appear as all 1's. The functioning of the Adder then effectively passes the A operand through to the output.

The G and P output from the Half-Add are utilized as input signals to the second Half-Add circuitry 220 and as inputs to the Borrow Look Ahead circuitry 222. (See FIG. 7)

Figure 10:
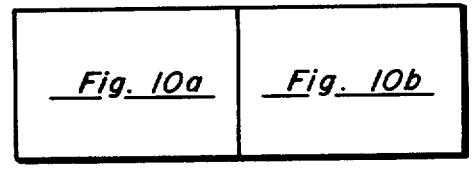
FIG. 10a and FIG. 10b, when arranged as in FIG. 10, is a detail logic circuit drawing of the borrow look ahead circuitry.

FIG. 10 is a detail logic circuit drawing of the Borrow Look Ahead circuitry. As mentioned previously, the Adder is arranged essentially as two parallel interconnected 6-bit adder circuits. In the Borrow Look Ahead the functioning of each 6-bit grouping is defined by equations 4 and 5.

$$\text{Borrow} = G0 + G1 \cdot P0 + G2 \cdot P0 \cdot P1 + G3 \cdot P0 \cdot P1 \cdot P2 + G4 \cdot P0 \cdot P1 \cdot P2 \cdot P3 + G5 \cdot P0 \cdot P1 \cdot P2 \cdot P3 \cdot P4 \text{(6-bit)} \quad \text{(Equation 4)}$$

$$\text{Propagate} = P0 \cdot P1 \cdot P2 \cdot P3 \cdot P4 \text{(5-bit)} \quad \text{(Equation 5)}$$

Equations 4 and 5 define the Upper Borrow Look Ahead logical functioning and inter-connections, and it will be understood that for the Lower Borrow and the Lower Propagate that the bit designations of 0 through 5 will be replaced with bit designations 6 through 11 sequentially respectively.

The Half-Add circuitry of the type described in FIG. 9 are shown by the blocks designated HA followed by the bit position designation. The G output terminal of each HA will be coupled to a line 216 followed by the bit position designation. For example, the G for the 0-bit would be referenced as 216-0. The P of each HA will be coupled to an output line 218 with a bit position designation. For example, the 5-bit P would be designated as the 218-5 line. The circuit arrangement that accomplishes the logic function of Equation 5 is comprised of OR circuits 340, 342, 344, and 346, and result in the 5-bit Propagate (Upper) signal on line 224PU. The arrangement for the Lower Propagate is a similar arrangement of OR circuits having identical reference numerals followed by the L designation. The logic circuitry that accomplishes the function of Equation 4 for generating the 6-bit Borrow signal is accomplished by OR circuits 348, 350, 352, 354, 356, and 346, and these OR circuits are utilized to drive AND circuits 358, 360, and 362, and the output signals from the AND circuits are directed as inputs to OR circuit 364 through respectively associated emitter followers, and result in the 6-bit Borrow signal (Upper) on line 224BU. In a similar manner, the Lower 6-bit Borrow signal is provided by output OR circuit 364L on line 224BL. The OR circuits and the AND circuits relating to the 6-bit Borrow (Lower) bear the same reference numeral as that for the Upper, followed by the L designation. These circuits function on the 6-bit group basis to evaluate the results of the initial half-add, to determine whether or not there will be borrow signals generated between groups. The Borrow Look Ahead allows the second half-add operation to proceed in parallel for the two 6-bit groups, which utilize ripple borrow within the 6-bit group.

Figure 11:
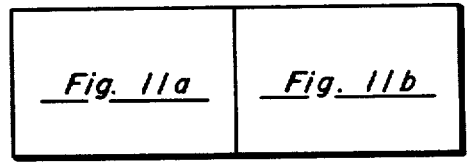
FIG. 11a through FIG. 11b, when arranged as shown in FIG. 11, are a detail logic circuit diagram of the second half-add circuitry.
Figure 11A:
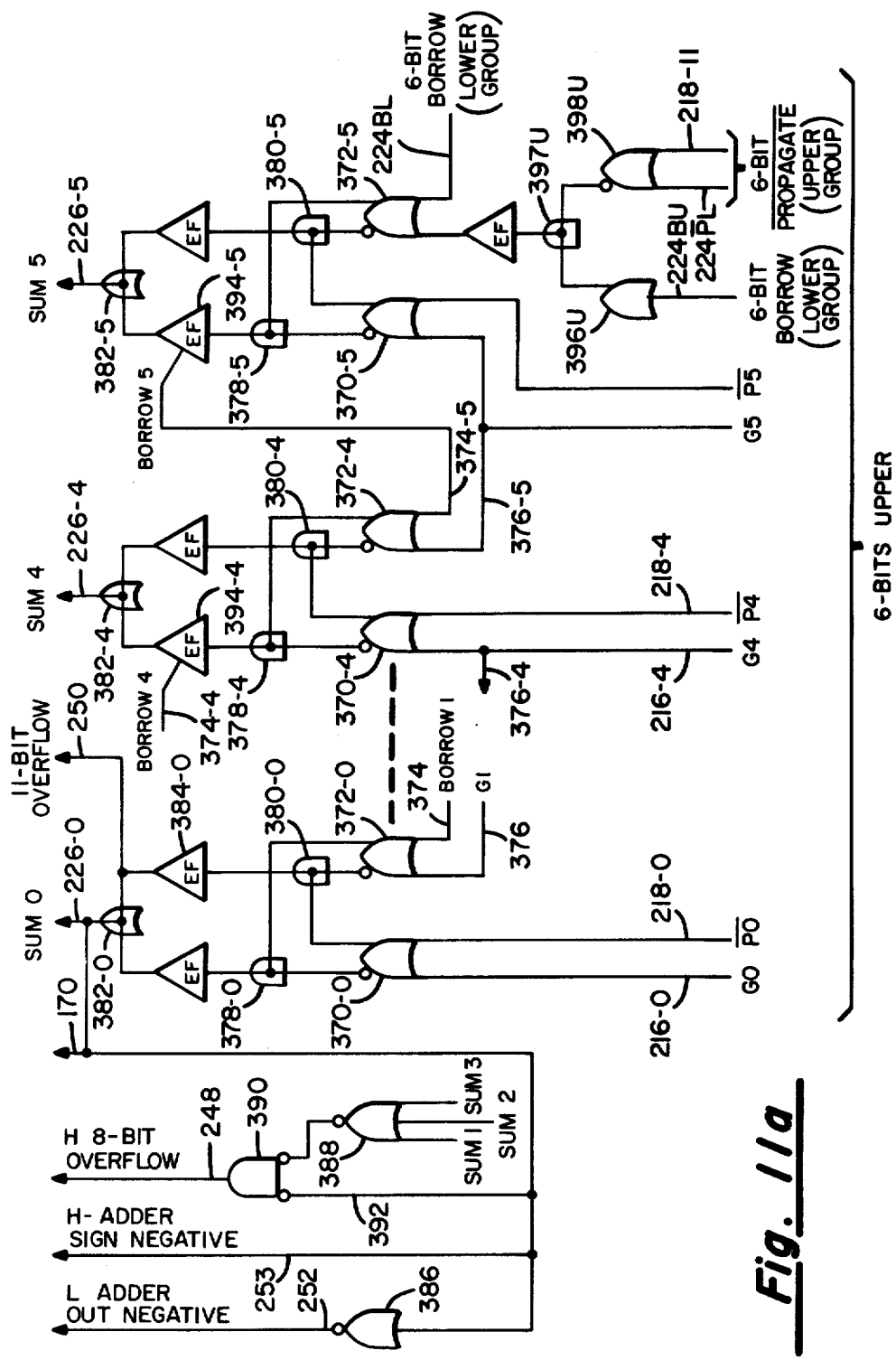
Figure 11B:
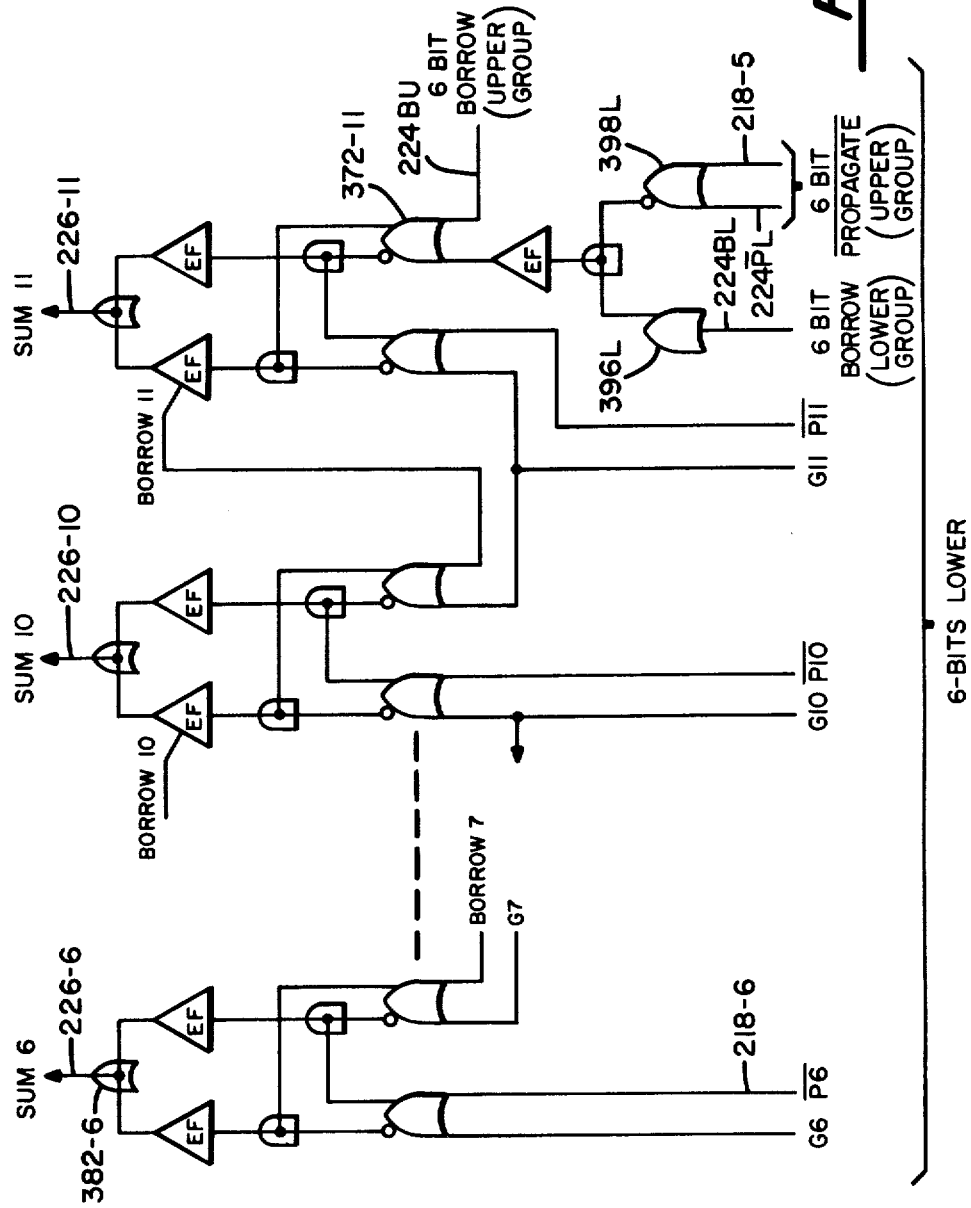

FIG. 11a through FIG. 11b, when arranged as shown in FIG. 11, are a detailed logic circuit diagram of the second half-add circuitry. The bit positions are basically symmetrical for all locations as it relates to the half-add function. The 0-bit position is unique in that it relates to the sign evaluation for this embodiment. It should be noted that in the 1's complement system, the sign could be designated as any of the bit positions for sensing purposes. The 5-bit position and the 11-bit position, that is the two lowest ordered bit positions for the 6-bit groupings differ somewhat from the other bit positions in that these two bit positions utilize group Borrow and group Propagate rather than the G and P adjacent bit positions where the borrow occurs on a ripple through basis. The 0-bit position utilizes OR circuit 370-0 to receive input signals G0 on line 216-0 and P0 on line 218-0. OR circuit 372-0 receives the Borrow ripple signal on line 374 and the G1 signal on line 376. The output of OR 372-0 is fed to AND 378-0, which also receives the complement output from OR 370-0. AND 380-0 receives the complement output of OR 372-0 and the true output of OR 370-0. The output from AND circuits 378-0 and 380-0 are passed through respectively associated emitter followers to OR circuit 382-0. The result of the input signals applied gives the result Sum 0 on line 226-0. The output from emitter follower 384-0 is also coupled to line 250 and provides the 11-Bit Overflow signal. Sum 0 output line 226-0 is coupled to line 253 and when a High signal is provided indicates the Adder Sign Negative condition exists. The Sum 0 output line 226-0 is also coupled to OR 386 which operates in response to a High input signal to produce a Low output signal on line 252 indicative that the Adder Out Negative condition exists. The 8-Bit Overflow condition is detected by the use of OR circuit 388 which is coupled to receive input signals from Sum 1, Sum 2, and Sum 3 bit positions (not shown), the output of which OR circuit is directed to Low AND circuit 390. The second input of Low AND circuit 390 is received from the Sum 0 bit position on line 392, and the output of which provides the 8-Bit Overflow signal on line 248. The system is such that in a 8-bit character mode, an Overflow is occurring and detected by the occurrence that the sign is positive, as indicated by a Low signal from the Sum 0 bit position and any of the bit positions 1 through 3 are in the 1 state. As mentioned previously, the floating-point Underflow is detected by the Adder Sign Out Negative signal on line 253 coupled with the condition that no Overflow condition exists for either the 8-bit or the 11-bit mode. Before proceeding to describe further the 11-bit Overflow cases, the balance of the adder circuitry will be described.

The 4-bit position receives the G4 signal on line 216-4 and presents it as an input to OR 370-4 and on line 376-4 as one of the ripple inputs to the 3-bit circuitry (not shown). The P4 signal is applied on line 218-4 to OR 370-4. OR 372-4 receives the G5 signal on line 376-5 and the Borrow 5 signal on line 374-5. AND circuits 378-4 and 380-4 are coupled to OR circuits 370-4 and 372-4 in the manner previously described, and the output of these AND circuits are directed through associated emitter followers circuits to OR circuit 382-4. Its output is directed to line 226-4 and provides the Sum 4 signal. Emitter follower 394-4 provides the Borrow 4 signal on line 374-4 which would be applied to the 3-bit circuitry (not shown).

The 5-bit position differs from the higher-ordered bit position in that it receives the 6-Bit Borrow signal from the Lower Group and it receives the 6-Bit Borrow signal from the Upper Group and it receives the 6-Bit Propagate signal from the Lower Group. As mentioned previously, the Characteristic Adder is divided into two parallel 6-bit adders thereby allowing the Borrow Look Ahead between groups. The 11-bit position is similarly arranged to handle the inter-group borrow. The 6-bit Borrow is applied on line 224BU to OR circuit 396U, whose output terminal is directed to AND circuit 397U. The 6-bit Propagate from the Lower Group is comprised of the 5-bit signal applied on line 224PL to OR circuit 398U. The 6-bit is the P11 and is applied on line 218-11. The component output of Or 398U is directed to AND 397U. The output of AND circuit 397U passes through an associated emitter follower as one of the input signals to OR 372-5. The 6-bit Borrow from the Lower Group is applied on line 224BL as the other input to OR circuit 372-5. It can be seen then that the occurrence of a 6-Bit Borrow within the group together with the situation of the 6-bit Propagate from the Lower Group will satisfy the borrow condition for the 5-bit position. Alternatively, the occurrence of the 6-Bit Borrow signal from the Lower Group will satisfy the borrow condition. The other circuit component in the 5-bit position comprise OR circuit 370-5, AND circuits 378-5 and 380-5, OR circuit 382-5 and emitter follower 394-5, all of which operate and function as previously described for the higher-ordered bit position.

The 6-Bits Lower are arranged essentially as that just described for the 6-Bits Upper, and the 6-bit, 10-bit, and 11-bit circuits with their inter-connected ripple borrow are illustrated. The Sum Six is provided on line 226-6 from OR 382-6, it being noted that the sign, Overflow, and Underflow circuitry are not repeated. The 7-bit, 8-bit, and 9-bit circuits are not shown. The 10-bit circuitry that provides the Sum 10 output signal on line 226-10 functions as described for the Sum 4 circuitry. The 11-bit circuitry functions similarly to the 5-bit circuitry and responds to the 6-Bit Borrow signal from the Lower Group received on line 224BL to OR circuit 396L. It also responds to the 6-Bit Borrow from the Upper Group applied on line 224BU to OR circuit 372-11. The 6-Bit Propagate comprised of the 5-Bit signal received from the Upper Group on line 224PL and the P5 signal applied on line 218-5 to OR circuit 398L complete this inter-group borrow evaluation. The balance of the 11-bit circuitry operates similarly to that previously described. The output signals on line 226-0 through 226-11 are then, the 1's complement sum or difference of the A and B operands applied at the input subjected to the control selections of the Function Control circuitry. The significance or meaning to be attached to the Sum signals, whether it be a characteristic, a shift count, or a magnitude will depend upon the operation within the entire arithmetic system, pursuant to the control of the Function Control circuitry.

It should be pointed out that the partitioning in the 6-bit groups renders the implementation by integrated circuitry quite efficient. Of course it should be understood that the logic could be implemented with discrete circuit components without departing from the spirit and scope of the invention. The Group Borrow and look ahead provides a speed up in operation and is made possible by the symmetry of the 1's complement system. If a higher rate of computation would be deemed essential, the ripple borrow structure could be replaced with a borrow tree of logic, utilizing techniques that are known in the art. The trade-off of the ripple borrow would be at the expense of additional circuitry for the borrow tree arrangement.

Having described the circuitry that establishes the sum or difference values of the two operands A and B it will be more readily understood how the Overflow conditions can be detected and signaled for the 8-bit and the 11-bit modes. As previously described, in the 8-bit mode Overflow is detected when the condition of the sign is positive, that is 0-bit is 0, and a 1 occurs at any of the Sum 1, or Sum 2, or Sum 3 output terminals. This condition was signaled by the output on line 248 from Low AND 390 as previously described.

In the 11-bit mode, the Overflow conditions for floating-point operations involving Add, Subtract, Multiply, Divide, and Pack instructions require various operations. For a floating-point Add or Subtract, the 11-bit Overflow signal is provided on line 250. In the following discussion the 0-bit of the C2-Register will be referred to as C20, and the 0-bit of the C1-Register will be referred to as C10. The Overflow condition for the Add will occur with a High signal on line 250 when there is no Borrow into the 0-bit adder and C20 exclusive-OR C10 produces a High. For the Subtract, Overflow is signaled for the condition when no Borrow signal is generated into the 0-bit circuitry and C20 exclusive-OR C10 produces a High output signal. It should be noted the renormalization right for a floating-point Add or Subtract where the larger characteristic is resident in the C2-Register, requires the addition of one to the characteristic, since the only possible normalization value is plus one. This is detected by the absence of a borrow into the 0-bit circuitry and the condition that C20 exclusive-OR C10 produces a High signal.

In the floating-point Multiply operation, only a normalization of a left shift of 1 is possible. It will be recalled that for Multiply, the characteristics are added together. The results of the addition of the two characteristics is transferred to the C2-Register, and an Overflow may already exist as determined by the 0-bit being a 1. Renormalization values of $2000_8$ indicates no renormalization is to take place, or a value of $2001_8$, indicative of left 1, are both possible. The appropriately selected value is subtracted from the contents of the C2-Register. Overflow of the normalized characteristic is then determined by the condition of no Borrow being generated into the 0-bit position and the C20 exclusive-OR C10 resulting in a 1 or High signal.

For a floating-point Divide, the only conditions possible for renormalization are the condition of no renormalization required, or shifting right one place. For a Divide instruction, the characteristics of the two operands are subtracted. No initial Overflow is possible for the Divide, but an Underflow is possible, and will be determined by the resultant value in C2-Register being negative. For Divide, renormalization values of $2000_8$, indicative of no renormalization, or $2001_8$, indicative of right 1, are possible. The appropriate value is added to the difference in C2-Register. Overflow is detected by the condition of no Borrow into the 0-bit circuitry and C20 exclusive-OR C10 yielding a 1 or a High output signal.

For the floating-point Pack operation, Overflow is possible only on right normalization. The unbiased characteristic utilizes the 1 through 11-bit positions of the C2-Register. Renormalization values of $2001_8$ through $2013_8$ are possible, with the selected value to be added to the contents of the C2-Register. Once the bias and the renormalization count has been added to the characteristic, it is tested for Overflow. The Overflow condition exists when there is no Borrow into the 0-bit circuitry and the C20 exclusive-OR C10 produces a 1 signal.

Figure 12:
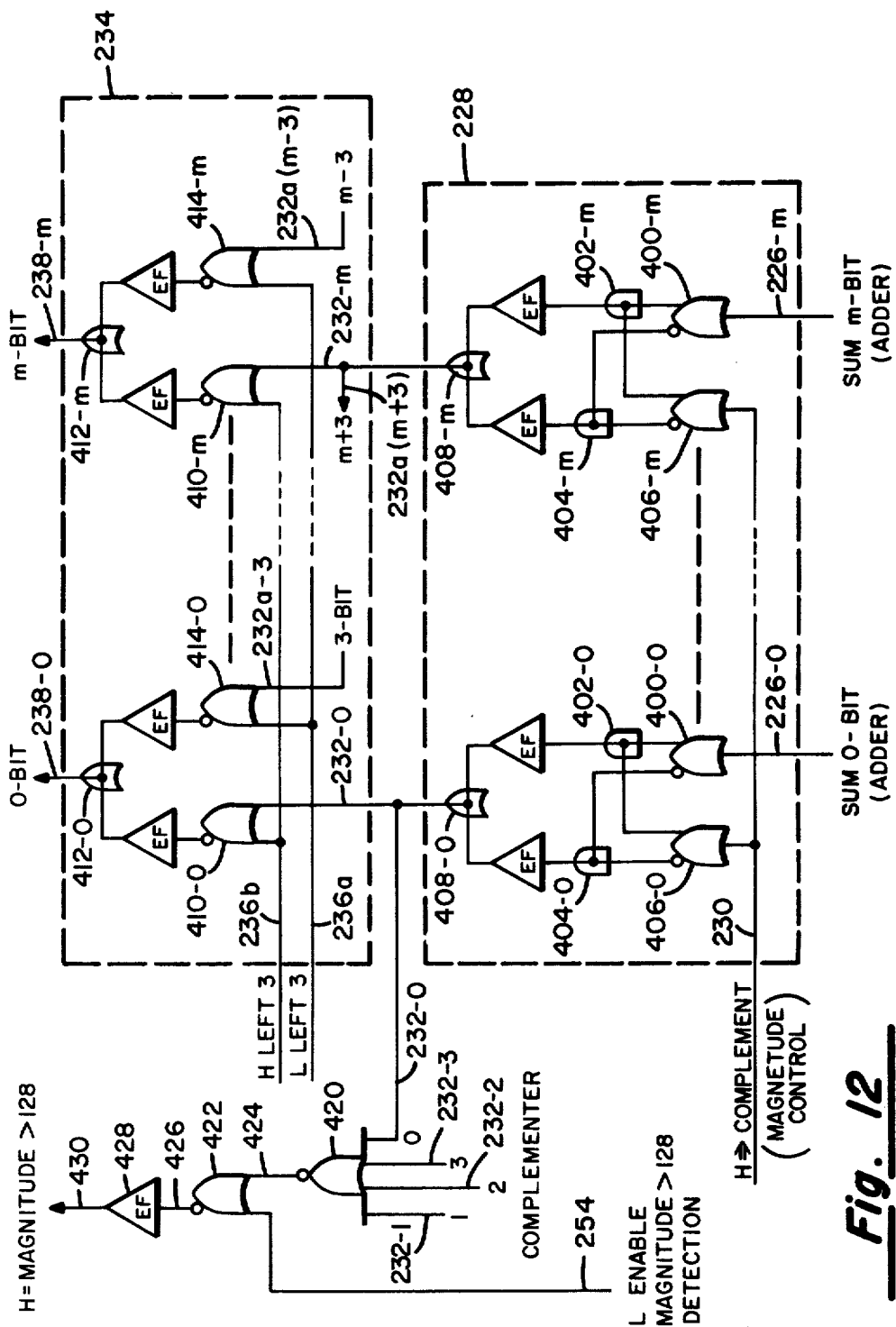
FIG. 12 is a detail logic circuit diagram of the complement circuitry and the left 3 circuitry together with the circuitry for detecting the magnitude greater than 128.

FIG. 12 is a detailed logic circuit diagram of the Complement circuitry and the Left 3 circuitry together with the circuitry for detecting the magnitude greater than 128. The Complement circuitry is shown enclosed within dashed block 228. Only the 0-bit and the m-bit are shown, it being understood that similar circuits would be required for each of the bit positions in the adder output. As previously described, the Complement signal is provided on line 230 to the Complement circuitry 228, and is coupled to each bit position circuitry. The 0-bit position circuitry will be described in detail, with like-arranged components in m-bit circuitry bearing similar reference numerals followed by the designation of the m bit. The Sum 0-bit is provided on line 226-0 through OR circuit 400-0, the output of which is directed to AND circuit 402-0 and the complement output of which is directed to AND circuit 404-0. The Complement signal provided on line 230 is directed to OR circuit 406-0, whose output terminal is coupled to AND circuit 402-0 and whose complement output terminal is coupled to AND 404-0. The output terminals of AND circuits 402-0 and 404-0 are coupled to respectively associated emitter-follower circuits to OR circuit 408-0. In operation, if the Sum 0-Bit is a 1, OR 400-0 will provide a High signal to AND 402-0, and a Low signal AND circuit 404-0. If the Complement signal is High, OR 406-0 would provide a High signal to AND 402-0 and a Low signal to AND 404-0. This results in AND 402-0 providing a High signal OR 408-0 which will be utilized by the Left 3 circuitry, shown enclosed in dashed block 234. At this point it will be pointed out that the output from OR 408-0 is not the complement of the output of the adder. Final complementation actually takes place in the Left 3 circuitry as will be described below. When the Complement signal is Low, OR 406-0 will provide a Low to AND 402-0 and a High to AND 404-0. Neither of the AND circuits 404-2 or 404-0 will be satisfied for a 1 input, so that output of OR 408-0 will be a Low, which when inverted in the Left 3 circuitry will result in a 1 output signal. The m-Bit circuitry is similar to that just described, with the Complement signal being applied on line 230 OR 406-m and the output of the adder for the m-Bit being applied on line 226-m to OR 400-m. AND circuits 402-m and 404-m are similarly connected and are utilized to drive OR 408-m.

The Left 3 circuitry is shown enclosed in dashed block 234, and for the 0-Bit utilizes OR 410-0 to receive the input signal on line 232-0 from OR 408-0. Similarly, the m-bit utilizes OR 410-m to receive the input signal on line 232-m. The High Left 3 signal is applied on line 236b to the OR circuits 410. Thus when the High signal is received it over-rides the output from the Complementer and the complement output from the OR 410-0 is directed through an associated emitter-follower to OR 412-0. When the signal on line 236b is Low, the input signal on line 232-0 will be inverted by OR 410-0 and directed to the OR 412-0 for output on line 238-0. As previously mentioned, the OR circuits 410 provide the final inversion for the output signals. Thus, when the signal on line 236b is Low, there is no shifting to the left of the result and the output is provided directly to line 238. For the left shift operation, OR 414-0 receives an input signal from the 3-bit position on line 232a-3. For the m-bit position, OR 414-m receives an input signal on line 232a(m-3). It will be noted that the OR 414 will not be utilized for bit positions 9, 10, and 11 since only 8 bits of the output will be utilized. The Low Left 3 signal on line 236a is applied to the OR circuits 414. When the signal received is Low, OR 414-0 will be responsive to the state of the 3-Bit which will be inverted and passed through its associated emitter-follower to OR 412-0. Thus if the 3-Bit is 1, as read out of the Complementer circuitry, it will be inverted and provided as a Low to OR 412-0. When the signal on line 236a is High, the OR 414 will all be disabled and will allow for the direct output to the output lines 238. The signals on line 236a and 236b are mutually exclusive, and will always be of the opposite state to provide for the appropriate direct or Left 3 transmission.

The circuitry for detecting when the magnitude of the output is greater than 128 utilizes an inverting OR circuit 420 together with an inverting OR circuit 422. The 0-Bit is provided from the output of the Complementer on line 232-0, the 1-bit is provided on line 232-1, the 2-bit is provided on line 232-2, and the 3-bit is provided on line 232-3. If any input signal to OR 420 is High, the output signal on line 424 will be Low, and the state of the output of OR 422 on line 426 will be dependent upon the state of the enable signal received on line 254. A Low signal on line 254 will enable the magnitude detection, and when present along with a Low signal on line 424 will result in High signal on line 426. This signal is fed through emitter-follower 428 on line 430, where it will be utilized to indicate that the smaller operand must be effectively ignored since it is beyond the range of the 72 bits of double-precision register capacity. A High signal on line 254 will effectively disable OR 422 since it will force the output on line 426 to a Low condition.

From the foregoing detail description of an embodiment of the novel Characteristic Adder for use in a floating-point data processing system, it can be seen that the various purposes and objectives of the invention have been met. It is of course understood that the detail configuration of a preferred embodiment is not intended to limit the scope of the invention, and what is intended to be protected by Letters Patent as set forth in the appended claims.

What is claimed is:

1. In a data processing system having an arithmetic system for performing floating-point arithmetic operations, a characteristic adder comprising:
    operand input means for receiving first and second operands, each comprised of a plurality of bits;
    adder means coupled to said operand input means for providing the sum of said first and second operands;
    output signaling means for providing output signals when said second operand is numerically greater than said first operand;
    overflow detecting means for selectively providing overflow indicating signals indicative of overflow error conditions;
    negative result detecting means for providing adder output negative signals when said sum is negative;
    function input means for receiving function signals indicative of selected operations to be performed by said adder means;
    function control means coupled to said function input means, said negative result detecting means, and said overflow detecting means, and said adder means for selectively controlling operation of said adder means in response to said function signals;
    magnitude means for selectively providing the magnitude output of said sum;
    complement means for selectively providing the 1's complement of said sum.

2. A characteristic adder as in claim 1 and further including
    format means coupled to said adder means and said function control means for selectively converting said sum to a first data format in response to first format selection signals and to a second data format in response to second format signals.

3. A characteristic adder as in claim 2 wherein said overflow detecting means includes
    first overflow detection means for detecting overflow in said first data format; and
    second overflow detection means for detecting overflow in said second data format.

4. A characteristic adder as in claim 3 and further including
    underflow means coupled to said overflow means, said negative result detecting means, and said function control means for selectively providing underflow indicating signals indicative of an underflow error condition.

5. A characteristic adder as in claim 4 and further including
    magnitude detection means coupled to said adder means and said function control means for selectively detecting when said sum exceeds a predetermined threshold value.

6. A characteristic adder as in claim 5 wherein said adder means comprises
    1's complement subtractive circuit means arranged for forming said sum by calculating the difference of said first operand and the 1's complement of said second operand.

7. A characteristic adder as in claim 6 wherein said operand input means includes
    complementing means for forming 1's complement of said second operand prior to performing one of the selected operations of said adder means.

8. A characteristic adder as in claim 7 and further including
    subtraction means coupled to said function control means and to said operand input means for selectively inhibiting said complementing means in response to complementing control signals received from said function control means for causing said adder means to form the difference of said first and second operands.

9. A characteristic adder as in claim 8 and further including
overflow and underflow disabling means for selectively inhibiting generation of said overflow indicating signals and said underflow indicating signals.

10. A characteristic adder as in claim 9 and further including
operand transfer means coupled to said function control means for selectively transferring said first or second operands through said adder means.

11. A characteristic adder as in claim 10 wherein said function control means includes
a plurality of latch means, each coupled to receive and temporarily store associated ones of said function signals from said function input means, said function signals for selectively directing operation of said adder means;
add or subtract selection means responsive to first function signals to alternatively select the addition operation or subtraction operation;
operand transfer means responsive to second function signals to alternatively select transfer of said first operand or said second operand through said adder means;
output selection means responsive to third function signals to alternatively select the calculated value of said sum or the complement value of said sum as the output from said adder means;
magnitude output selection means responsive to fourth function signals to select the magnitude value of said sum as the output from said adder means;
sum magnitude detection means responsive to fifth function signals to enable detection of the magnitude of said sum;
format selection means responsive to sixth function signals to alternatively select operation in said first or said second data formats; and
fault signaling means responsive to seventh function signals for alternatively enabling or disabling detection and output of said overflow and said underflow indicating signals.

12. A characteristic adder as in claim 11 wherein said adder means includes
first half-add means for providing borrow signals and propagate signals in response to said first and second operands;
borrow look ahead means coupled to said first half-add means for providing group borrow signals and group propagate signals; and
second half-add means partitioned in predetermined bit groupings and including ripple borrow means within said bit groupings and coupled to said first half-add means and said borrow look ahead means for forming said sum.

13. A characteristic adder as in claim 12 wherein said adder means includes
sign means for indicating the algebraic sign of said sum; and
sum output means for providing p-bits of said sum in said first data format comprising the larger bit capacity operand format, and q-bits of said sum in said second data format comprising the smaller bit capacity operand format, with p-bits minus q-bits comprising r-bits and representing the difference in bit capacity between said first and second data formats;
said first overflow detection means is coupled to said sign means for detecting overflow in said first data format and providing first format overflow indicating signals;
said second overflow detection means is coupled to said sign means and selected r-bits of said output means for detecting overflow in said second format when said sign is of a first value and any one of said selected r-bits is of a second value, and providing second format overflow indicating signals;
said output signaling means is coupled to said sign means; and
said negative result detecting means is coupled to said sign means for providing adder out negative signals and sign negative signals when said sign means indicates a negative algebraic sign of the calculated sum.

14. A characteristic adder as in claim 13 wherein
said complement means is coupled to said sum output means and said function control means for selectively generating the 1's complement of said sum and
said format means includes input terminals coupled to said complement means and said function control means for selectively transmitting p-bits of said sum or said complement of said sum in said first data format, or selectively transmitting q-bits of said sum or said complement of said sum shifted r-places in said second data format.

15. For use in a data processing system having an arithmetic system for performing floating-point arithmetic calculations in two data formats wherein each format includes a characteristic portion representing an exponent and a mantissa portion representing data, unpacking circuitry for separating the characteristics and the mantissas and positioning the characteristics depending upon the data format, a main adder for adding or subtracting the mantissas, a shifting matrix for shifting selected ones of the mantissas for alignment prior to addition or subtraction according to a calculated shift count determined from the relationship of the characteristics, registers for storing the characteristics, normalizing circuitry for normalizing the results, and control circuitry for controlling sequences of each floating-point instruction pursuant to an instruction word, circuitry for biasing and combining the resultant mantissa and resultant characteristic, a characteristic adder comprising:
first operand input means for receiving a first operand from the register storing it;
second operand input means for receiving a second operand from the register storing it;
exclusive-OR means coupled to said second operand input means for selectively providing the true or 1's complement value of said second operand;
adder means including
first half-add means coupled to said first operand input means and said exclusive-OR means for generating borrow and propagate signals derived from said first and second operands;
borrow look ahead means coupled to said first half-add means for providing group borrow signals and group propagate signals;
second half-add means partitioned in predetermined bit groupings and including ripple borrow means within said bit groupings and coupled to said first half-add means and said borrow look ahead means for forming said sum;

output signaling means for providing output signals when said second operand is numerically greater than said first operand for controlling which mantissa will be selected for shifting in alignment;

first and second overflow detecting means for selectively providing first and second overflow indicating signals indicative of overflow error conditions;

negative result detecting means for providing adder output negative signals when said sum is negative;

function input means for receiving function signals indicative of selected operations of said adder means;

function control means coupled to said function input means, said negative result detecting means and said overflow detecting means and said adder means for selectively controlling operation of said adder means in response to said function signals;

magnitude means for selectively providing the magnitude output of said sum;

complement means for selectively providing the 1's complement of said sum;

format means coupled to said adder means and said function control means for selectively converting said sum to a first data word format in response to first format selection signals and to a second data format in response to second format signals;

underflow means coupled to said overflow means, said negative result detecting means and said function control means for selectively providing underflow indicating signals indicative of an underflow error condition;

overflow and underflow disabling means for selectively inhibiting generation of said overflow indicating signals and said underflow indicating signals;

magnitude detection means coupled to said adder means and said function control means for selectively detecting when said sum exceeds a predetermined threshold value.

16. A characteristic adder as in claim 15 wherein said function control means includes a plurality of latch means, each coupled to receive and temporarily store associated ones of said function signals from said function input means, said function signals for selectively directing operation of said adder means;

add or subtract selection means responsive to first function signals to alternatively select the addition operation or subtraction operation;

operand transfer means responsive to second function signals to alternatively select transfer of said first operand or said second operand through said adder means;

output selection means responsive to third function signals to alternatively select the calculated value of said sum or the complement value of said sum as the output from said adder means;

magnitude output selection means responsive to fourth function signals to select the magnitude value of said sum as the output from said adder means;

sum magnitude detection means responsive to fifth function signals to enable detection of the magnitude of said sum;

format selection means responsive to sixth function signals to alternatively select operation in said first or said second data formats; and fault signaling means responsive to seventh function signals for alternatively enabling or disabling detection and output of said overflow and said underflow indicating signals.

17. A characteristic adder as in claim 16 wherein said adder means includes sign means for indicating the algebraic sign of said sum; and sum output means for providing p-bits of said sum in said first data format comprising the larger bit capacity operand format, and q-bits of said sum in said second data format comprising the smaller bit capacity operand format, with p-bits minus q-bits comprising r-bits and representing the difference in bit capacity between said first and second data formats;

said first overflow detection means is coupled to said sign means for detecting overflow in said first data format and providing first format overflow indicating signals;

said second overflow detection means is coupled to said sign means and selected r-bits of said output means for detecting overflow in said second format when said sign is of a first value and any one of said selected r-bits is of a second value, and providing second format overflow indicating signals;

said output signaling means is coupled to said sign means; and said negative result detecting means is coupled to said sign means for providing adder out negative signals and sign negative signals when said sign means indicates a negative algebraic sign of the calculated sum.

18. A characteristic adder as in claim 17 wherein said complement means is coupled to said sum output means and said function control means for selectively generating the 1's complement of said sum and said format means includes input terminals coupled to said complement means and said function control means for selectively transmitting p-bits of said sum or said complement of said sum in said first data format, or selectively transmitting q-bits of said sum or said complement of said sum shifted r-places in said second data format.

* * * * *

UNITED STATES PATENT AND TRADEMARK OFFICE
CERTIFICATE OF CORRECTION

PATENT NO. : 4,366,548

DATED : December 28, 1982

INVENTOR(S) : Glen R. Kregness et al.

It is certified that error appears in the above-identified patent and that said Letters Patent are hereby corrected as shown below:

Column 31, Line 49 "propagate" should be — propagate — .

Column 31, Line 53, "propagate" should be — propagate — .

Column 32, Line 61, "propagate" should be — propagate — .

Column 32, Line 65, "propagate" should be — propagate — .

Signed and Sealed this

Fifteenth Day of March 1983

[SEAL]

Attest:

GERALD J. MOSSINGHOFF

Attesting Officer     Commissioner of Patents and Trademarks